US012565590B2

(12) United States Patent
Mori et al.

(10) Patent No.: US 12,565,590 B2
(45) Date of Patent: Mar. 3, 2026

(54) ANTIFOULING COATING COMPOSITION AND ANTIFOULING COATING FILM

(71) Applicant: NIPPON PAINT MARINE COATINGS CO., LTD., Osaka (JP)

(72) Inventors: Tomoya Mori, Osaka (JP); Yasuhisa Nagase, Osaka (JP); Mamoru Shimada, Osaka (JP)

(73) Assignee: NIPPON PAINT MARINE COATINGS CO., LTD., Osaka (JP)

( * ) Notice: Subject to any disclaimer, the term of this patent is extended or adjusted under 35 U.S.C. 154(b) by 0 days.

(21) Appl. No.: 18/862,056

(22) PCT Filed: Mar. 5, 2024

(86) PCT No.: PCT/JP2024/008234

§ 371 (c)(1),
(2) Date: Oct. 31, 2024

(87) PCT Pub. No.: WO2024/185767

PCT Pub. Date: Sep. 12, 2024

(65) Prior Publication Data

US 2025/0109304 A1 Apr. 3, 2025

(30) Foreign Application Priority Data

Mar. 9, 2023 (JP) ................................ 2023-036322

(51) Int. Cl.
*C09D 5/16* (2006.01)
*B63B 59/04* (2006.01)
*C09D 183/06* (2006.01)

(52) U.S. Cl.
CPC ............ *C09D 5/1693* (2013.01); *B63B 59/04* (2013.01); *C09D 5/1618* (2013.01); *C09D 5/1625* (2013.01); *C09D 5/1687* (2013.01); *C09D 183/06* (2013.01)

(58) Field of Classification Search
CPC .. C09D 5/1693; C09D 5/1687; C09D 5/1625; C09D 5/1618; C09D 183/06; B63B 59/04
USPC ........................................................ 523/122
See application file for complete search history.

(56) References Cited

U.S. PATENT DOCUMENTS

| | | | | |
|---|---|---|---|---|
| 9,845,395 | B2 * | 12/2017 | Ehara | C09D 5/1618 |
| 10,364,370 | B1 | 7/2019 | Takao et al. | |
| 10,487,216 | B2 * | 11/2019 | Takao | C09D 7/65 |
| 11,905,432 | B2 * | 2/2024 | Nagase | C09D 5/1675 |
| 2012/0202080 | A1 * | 8/2012 | Ehara | C09D 5/165 524/588 |
| 2015/0210797 | A1 | 7/2015 | Tamura et al. | |
| 2019/0300725 | A1 * | 10/2019 | Takao | C09D 143/04 |
| 2020/0056055 | A1 * | 2/2020 | Niimoto | C09D 183/10 |
| 2021/0024770 | A1 | 1/2021 | Yamamori et al. | |
| 2023/0416568 | A1 * | 12/2023 | Nagase | C09D 5/1675 |
| 2024/0002677 | A1 | 1/2024 | Tanino | |

FOREIGN PATENT DOCUMENTS

| | | | |
|---|---|---|---|
| EP | 2537596 | A1 | 12/2012 |
| EP | 4223513 | A1 | 8/2023 |
| JP | 10-251598 | A | 9/1998 |
| JP | 2019-026768 | A | 2/2019 |
| JP | 7324380 | B1 | 8/2023 |
| KR | 10-2020-0004787 | A | 1/2020 |
| WO | 2011/046086 | A1 | 4/2011 |
| WO | 2019/187053 | A1 | 10/2019 |
| WO | 2019/187055 | A1 | 10/2019 |
| WO | 2022/070978 | A1 | 4/2022 |
| WO | 2022/190755 | A1 | 9/2022 |

OTHER PUBLICATIONS

Japanese Office Action for JP2023-036322 dated Dec. 26, 2023.
International Search Report for PCT/JP2024/008234 dated May 7, 2024.
Written Opinion for PCT/JP2024/008234 dated May 7, 2024.
Communication dated May 23, 2025 from the Intellectual Property Office of Singapore in application No. 11202407563V.
Communication issued Aug. 8, 2025 in Korean Application No. 10-2024-7039162.
Extended European Search Report issued Oct. 9, 2025 in Application No. 24767134.0.

* cited by examiner

*Primary Examiner* — Robert T Butcher
(74) *Attorney, Agent, or Firm* — Sughrue Mion, PLLC

(57) ABSTRACT

Provided is an antifouling coating composition comprising a silicon atom-containing resin. The silicon atom-containing resin includes a constituent unit (A) derived from a monomer (a) having at least one kind of silicon atom-containing group selected from the group consisting of a group represented by a formula (I), a group represented by a formula (II), a group represented by a formula (III), and a group represented by a formula (IV); and a constituent unit (B) derived from a monomer (b) which is a polyfunctional (meth)acrylic acid ester having two or more (meth)acryloyl groups.

16 Claims, No Drawings

ANTIFOULING COATING COMPOSITION AND ANTIFOULING COATING FILM

CROSS REFERENCE TO RELATED APPLICATIONS

This application is a National Stage of International Application No. PCT/JP2024/008234 filed Mar. 5, 2024, claiming priority based on Japanese Patent Application No. 2023-036322 filed Mar. 9, 2023.

TECHNICAL FIELD

The present invention relates to an antifouling coating composition containing a silicon atom-containing resin. The present invention also relates to an antifouling coating film formed from the antifouling coating composition, a composite coating film including the antifouling coating film, and a ship and an in-water structure provided with the antifouling coating film or the composite coating film.

BACKGROUND ART

In a ship, adhesion of organisms such as barnacles, mussels, and algae to parts in contact with sea water causes problems such as hindrance of efficient travel and waste of fuel. Conventionally, an antifouling coating composition is applied on the surface of the ship in order to prevent the adhesion of organisms. For example, WO 2011/046086 (PTL 1) discloses an antifouling coating composition containing a silicon atom-containing resin as a vehicle and a thermoplastic resin and/or a plasticizer.

CITATION LIST

Patent Literature

PTL 1: WO 2011/046086

SUMMARY OF INVENTION

Technical Problem

An antifouling coating film formed from an antifouling coating composition is required to exhibit good antifouling performance for a long period of time while immersed in water (sea water). Also, the antifouling coating film is required to be strong and tough enough not to be easily degraded.

An object of the present invention is to provide an antifouling coating composition that makes it possible to form an antifouling coating film having good antifouling performance and good impact resistance. Another object of the present invention is to provide an antifouling coating film formed from the antifouling coating composition, a composite coating film including the antifouling coating film, and a ship and an in-water structure provided with the antifouling coating film or the composite coating film.

Solution to Problem

The present invention provides the following antifouling coating composition, antifouling coating film, composite coating film, ship, and in-water structure.

[1] An antifouling coating composition comprising a silicon atom-containing resin, wherein the silicon atom-containing resin includes:

a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below; and a constituent unit (B) derived from a monomer (b) which is a polyfunctional (meth)acrylic acid ester having two or more (meth)acryloyloxy groups:

[Chemical formula 1]

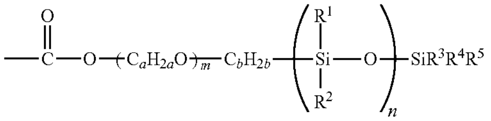

(I)

[in the formula (I), a and b each independently represent an integer of 2 to 5, m represents an integer of 0 to 50, and n represents an integer of 3 to 270; and $R^1$ to $R^5$ each independently represent an alkyl group, an alkoxy group, a phenyl group, a substituted phenyl group, a phenoxy group, or a substituted phenoxy group];

[Chemical formula 2]

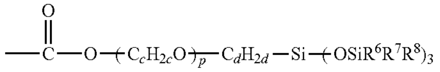

(II)

[in the formula (II), c and d each independently represent an integer of 2 to 5, and p represents an integer of 0 to 50; $R^6$, $R^7$ and $R^8$ each independently represent an alkyl group, $R^a$, or $R^b$;

$R^a$ is

[Chemical formula 3]

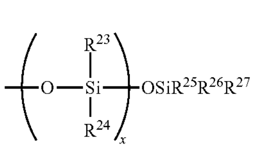

(in the formula, x represents an integer of 0 to 200, and $R^{23}$ to $R^{27}$ are the same or different and each represent an alkyl group); and $R^b$ is

[Chemical formula 4]

$$-R^{28}-(OC_2H_4)_y-OR^{29}$$

(in the formula, y represents an integer of 1 to 200, and $R^{28}$ and $R^{29}$ are the same or different and each represent an alkyl group)];

[Chemical formula 5]

(III)

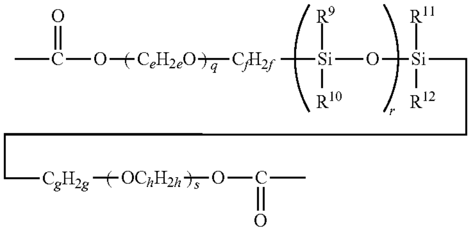

[in the formula (III), e, f, g, and h each independently represent an integer of 2 to 5, q and s each independently represent an integer of 0 to 50, and r represents an integer of 3 to 270; and $R^9$ to $R^{12}$ each independently represent an alkyl group, an alkoxy group, a phenyl group, a substituted phenyl group, a phenoxy group, or a substituted phenoxy group];

[Chemical formula 6]

(IV)

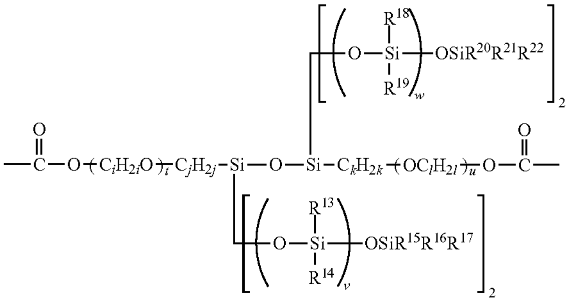

[in the formula (IV), i, j, k, and l each independently represent an integer of 2 to 5, t and u each independently represent an integer of 0 to 50, and v and w each independently represent an integer of 0 to 70; and $R^{13}$ to $R^{22}$ are the same or different and each represent an alkyl group].

[2] The antifouling coating composition according to [1], wherein the silicon atom-containing resin further includes a constituent unit (C) derived from a monomer (c) having a triorganosilyloxycarbonyl group.

[3] The antifouling coating composition according to [1] or [2], wherein the silicon atom-containing resin further includes a constituent unit (D) derived from a monomer (d) which is a monofunctional (meth)acrylic acid ester represented by a formula (d) below:

$$CH_2{=}C(R^C)(COOR^D) \quad \text{(d)}$$

[in the formula (d), $R^C$ represents a hydrogen atom or a methyl group; and $R^D$ represents a monovalent group including one or more kinds selected from the group consisting of a hydroxyl group, a carboxy group, and an oxyalkylene chain].

[4] The antifouling coating composition according to [3], wherein $R^D$ in the formula (d) represents a monovalent group containing an oxyalkylene chain.

[5] The antifouling coating composition according to any one of [1] to [4], wherein a content of the constituent unit (A) is greater than or equal to 20 mass % in all constituent units contained in the silicon atom-containing resin.

[6] The antifouling coating composition according to any one of [1] to [5], wherein a content of the constituent unit (B) is less than or equal to 15 mass % in all constituent units contained in the silicon atom-containing resin.

[7] The antifouling coating composition according to any one of [1] to [6], wherein the silicon atom-containing resin further includes a constituent unit (E) derived from a monomer (e) having at least one kind of metal atom-containing group selected from the group consisting of a group represented by a formula (V) below and a group represented by a formula (VI) below:

[Chemical formula 7]

(V)

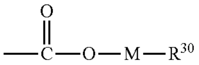

[in the formula (V), M represents a divalent metal atom, and $R^{30}$ represents an organic acid residue or an alcohol residue]; and

[Chemical formula 8]

(VI)

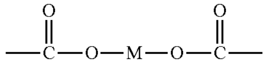

[in the formula (VI), M represents a divalent metal atom].

[8] The antifouling coating composition according to any one of [1] to [7], not comprising an antifouling agent.

[9] The antifouling coating composition according to any one of [1] to [7], further comprising an antifouling agent.

[10] The antifouling coating composition according to [9], wherein the antifouling agent is at least one kind selected from the group consisting of cuprous oxide, pyrithione metal salt, 4,5-dichloro-2-n-octyl-4-isothiazolin-3-one, 2-methylthio-4-t-butylamino-6-cyclopropylamino-s-triazine, 4-bromo-2-(4-chlorophenyl)-5-(trifluoromethyl)-1H-pyrrole-3-carbonitrile, and medetomidine.

[11] An antifouling coating film formed from the antifouling coating composition according to any one of [1] to [10].

[12] A composite coating film comprising a primer coating film formed from an antirust coating composition, and an antifouling coating film formed from the antifouling coating composition according to any one of [1] to [10] and overlaid on the primer coating film.

[13] A ship comprising the antifouling coating film according to [11] or the composite coating film according to [12].

[14] An in-water structure comprising the antifouling coating film according to [11] or the composite coating film according to [12].

Advantageous Effects of Invention

It is possible to provide an antifouling coating composition that makes it possible to form an antifouling coating film having good antifouling performance and good impact resistance. It is also possible to provide an antifouling coating film formed from the antifouling coating composition, a composite coating film including the antifouling coating film, and a ship and an in-water structure provided with the antifouling coating film or the composite coating film.

DESCRIPTION OF EMBODIMENTS

<Antifouling Coating Composition>

An antifouling coating composition according to the present invention (hereinafter, also simply referred to as a "coating composition") contains a specific silicon atom-containing resin described later. The coating composition according to the present invention makes it possible to form an antifouling coating film (hereinafter, also simply referred to as a "coating film") capable of exhibiting good antifouling performance for a long period of time while immersed in water (sea water). The coating composition according to the present invention also makes it possible to form a coating film having good impact resistance and not to be easily degraded. The coating composition according to the present invention can be suitably used as an antifouling coating composition to be applied to an underwater moving body such as a ship or to an in-water structure.

Hereinafter, components that are contained or may be contained in the coating composition will be described in detail.

(1) Silicon Atom-Containing Resin

The silicon atom-containing resin contained in the coating composition includes a constituent unit (A) and a constituent unit (B). The constituent unit (A) is a constituent unit derived from a monomer (a) having at least one kind of a silicon atom-containing group selected from the group consisting of a group represented by the formula (I), a group represented by the formula (II), a group represented by the formula (III), and a group represented by the formula (IV). The constituent unit (B) is a constituent unit derived from a monomer (b) which is a polyfunctional (meth)acrylic acid ester having two or more (meth)acryloyl groups. One preferable example of the silicon atom-containing resin is a (meth)acrylic resin including the silicon atom-containing group.

The silicon atom-containing resin may include a constituent unit derived from a monomer other than the monomer (a) and the monomer (b). An example of the constituent unit may be:

- a constituent unit (C) derived from a monomer (c) having a triorganosilyloxycarbonyl group;
- a constituent unit (D) derived from a monomer (d) which is a monofunctional (meth)acrylic acid ester represented by the formula (d);
- a constituent unit (E) derived from a monomer (e) having at least one kind of metal atom-containing group selected from the group consisting of a group represented by the formula (V) and a group represented by the formula (VI); or the like.

In the present description, "(meth)acryloyl" refers to at least one of methacryloyl and acryloyl; "(meth)acrylic" refers to at least one of methacrylic and acrylic; and "(meth) acrylate" refers to at least one of methacrylate and acrylate.

(1-1) Silicon Atom-Containing Group

The silicon atom-containing group included in the monomer (a) is at least one kind selected from the group consisting of a group represented by the formula (I), a group represented by the formula (II), a group represented by the formula (III), and a group represented by the formula (IV).

In the formula (I), a and b each independently represent an integer of 2 to 5, m represents an integer of 0 to 50, and n represents an integer of 3 to 270. $R^1$ to $R^5$ each independently represent an alkyl group, an alkoxy group, a phenyl group, a substituted phenyl group, a phenoxy group, or a substituted phenoxy group.

In the formula (II), c and d each independently represent an integer of 2 to 5, and p represents an integer of 0 to 50. $R^6$, $R^7$, and $R^8$ each independently represent an alkyl group, $R^a$, or $R^b$;

In $R^a$, x represents an integer of 0 to 200. $R^{23}$ to $R^{27}$ are the same or different and each represent an alkyl group.

In $R^b$, y represents an integer of 1 to 200. $R^{28}$ to $R^{29}$ are the same or different and each represent an alkyl group.

In the formula (III), e, f, g, and h each independently represent an integer of 2 to 5, q and s each independently represent an integer of 0 to 50, and r represents an integer of 3 to 270. $R^9$ to $R^{12}$ each independently represent an alkyl group, an alkoxy group, a phenyl group, a substituted phenyl group, a phenoxy group, or a substituted phenoxy group.

In the formula (IV), i, j, k, and l each independently represent an integer of 2 to 5, t and u each independently represent an integer of 0 to 50, and v and w each independently represent an integer of 0 to 70. $R^{13}$ to $R^{22}$ are the same or different and each represent an alkyl group.

The silicon atom-containing resin may include two or more kinds of silicon atom-containing groups selected from the group consisting of a group represented by the formula (I), a group represented by the formula (II), a group represented by the formula (III), and a group represented by the formula (IV). In this case, the silicon atom-containing resin may include two or more kinds of groups represented by the formula (I), two or more kinds of groups represented by the formula (II), two or more kinds of groups represented by the formula (III), and/or two or more kinds of groups represented by the formula (IV).

(1-2) Monomer (a)

The monomer (a) is preferably at least one kind selected from the group consisting of a monomer (a1) represented by the formula (I'), a monomer (a2) represented by the formula (II'), a monomer (a3) represented by the formula (III'), and a monomer (a4) represented by the formula (IV'). The monomer (a1) represented by the formula (I'), the monomer (a2) represented by the formula (II'), the monomer (a3) represented by the formula (III'), and the monomer (a4) represented by the formula (IV') are silicon atom-containing polymerizable monomers respectively including a group represented by the formula (I), a group represented by the formula (II), a group represented by the formula (III), and a group represented by the formula (IV).

[Chemical formula 9]

(I')

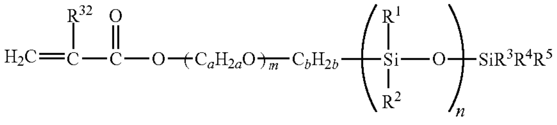

[In the formula (I'), $R^{31}$ represents a hydrogen atom or a methyl group, and a, b, m, n and $R^1$ to $R^5$ represent the same meaning as previously mentioned.]

[Chemical formula 10]

(II')

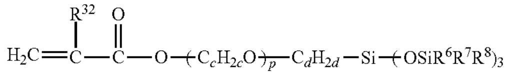

[In the formula (II'), $R^{32}$ represents a hydrogen atom or a methyl group, and c, d, p, and $R^6$ to $R^8$ represent the same meaning as previously mentioned.]

[Chemical formula 11]

(III')

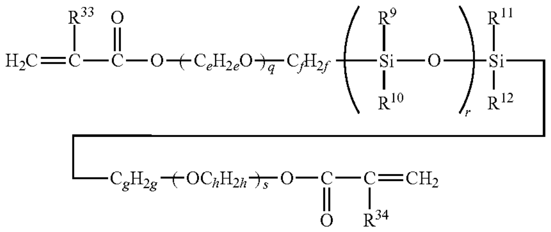

[In the formula (III'), R and R each independently represent a hydrogen atom or a methyl group, and e, f, g, h, q, r, s and $R^9$ to $R^{12}$ represent the same meaning as previously mentioned.]

[Chemical formula 12]

The silicon atom-containing resin may include two or more kinds of constituent units derived from the monomer (a1).

In the formula (I') [the same applies to the formula (I)], a is preferably 2 or 3.

b is preferably 2 or 3.

m is preferably greater than or equal to 0 and less than or equal to 25, and more preferably greater than or equal to 0 and less than or equal to 20, from the viewpoint of water resistance, the adhesion to the substrate, and the like of the coating film. m may be greater than or equal to 3 or greater than or equal to 5, and less than or equal to 10 or less than or equal to 8.

n is usually greater than or equal to 3 and less than or equal to 270, preferably greater than or equal to 35 and less than or equal to 245, more preferably greater than or equal to 45 and less than or equal to 205, and still more preferably greater than or equal to 45 and less than or equal to 160, from the viewpoint of antifouling performance of the coating film and solubility in common organic solvents.

(IV')

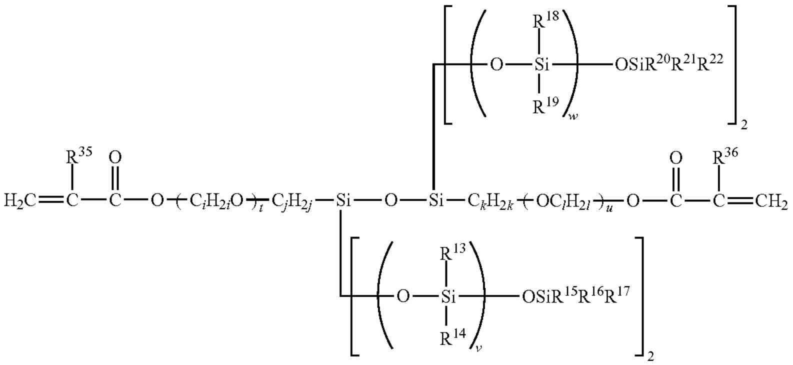

[In the formula (IV'), $R^{35}$ and $R^{36}$ each independently represent a hydrogen atom or a methyl group, and i, j, k, l, t, u, v, w and $R^{13}$ to $R^{22}$ represent the same meaning as previously mentioned.]

By polymerization of the monomer composition containing the monomer (a), a silicon atom-containing resin that is a (meth)acrylic resin including a constituent unit (A) derived from the monomer (a) selected from the group consisting of the monomer (a1), the monomer (a2), the monomer (a3) and the monomer (a4) can be obtained. This silicon atom-containing resin includes at least one kind of silicon atom-containing group selected from the group consisting of a group represented by the formula (I), a group represented by the formula (II), a group represented by the formula (III), and a group represented by the formula (IV).

The silicon atom-containing resin may include two or more kinds of constituent units (A) derived from the monomer (a).

The monomer (a) may be a combination of two or more kinds of monomers belonging to the monomer (a). The two or more kinds of monomers may have molecular weights different from each other.

The monomer (a1) is represented by the formula (I'). By using the monomer (a1) as the monomer (a), a silicon atom-containing resin that is a (meth)acrylic resin having a silicon atom-containing group represented by the formula (I) in the side chain is obtained.

Examples of a substituent of the substituted phenyl group and substituted phenoxy group in $R^1$ to $R^5$ include an alkyl group and a halogen atom.

$R^1$ to $R^5$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

As the monomer (a1), commercially available products may be used. Examples of commercially available products include:

"FM-0711" (one-terminal methacryloyloxyalkyl-modified organopolysiloxane, molecular weight: 1,000), "FM-0721" (one-terminal methacryloyloxyalkyl-modified organopolysiloxane, molecular weight: 5,000), and "FM-0725" (one-terminal methacryloyloxyalkyl-modified organopolysiloxane, molecular weight: 10,000) manufactured by JNC Corporation; and "X-22-2404" (one-terminal methacryloyloxyalkyl-modified organopolysiloxane, molecular weight: 420), "X-22-174ASX" (one-terminal methacryloyloxyalkyl-modified organopolysiloxane, molecular weight: 900), "X-22-174BX" (one-terminal methacryloyloxyalkyl-modified organopolysiloxane, molecular weight: 2,300), "KF-2012"

(one-terminal methacryloyloxyalkyl-modified organopolysiloxane, molecular weight: 4,600), and "X-22-2426" (one-terminal methacryloyloxyalkyl-modified organopolysiloxane, molecular weight: 12,000) manufactured by Shin-Etsu Chemical.

The monomer (a2) is represented by the formula (II'). By using the monomer (a2) as the monomer (a), a silicon atom-containing resin that is a (meth)acrylic resin having a silicon atom-containing group represented by the formula (II) in the side chain is obtained.

The silicon atom-containing resin may include two or more kinds of constituent units derived from the monomer (a2).

In the formula (II') [the same applies to the formula (II)], c is preferably 2 or 3.

d is preferably 2 or 3.

p is preferably greater than or equal to 0 and less than or equal to 25, and more preferably greater than or equal to 0 and less than or equal to 20, from the viewpoint of water resistance, the adhesion to the substrate, and the like of the coating film. p may be greater than or equal to 3 or greater than or equal to 5, and less than or equal to 10 or less than or equal to 8.

x is usually greater than or equal to 0 and less than or equal to 200, preferably greater than or equal to 10 and less than or equal to 150, and more preferably greater than or equal to 20 and less than or equal to 125, from the viewpoint of solubility in common organic solvents.

y is usually greater than or equal to 1 and less than or equal to 200, preferably greater than or equal to 10 and less than or equal to 150, and more preferably greater than or equal to 20 and less than or equal to 125, from the viewpoint of solubility in common organic solvents.

Alkyl groups in $R^6$ to $R^8$ and $R^{23}$ to $R^{29}$ are each preferably an alkyl group having 1 to 6 carbon atoms, more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and still more preferably a methyl group or an ethyl group.

It is preferable that all of $R^6$ to $R^8$ are alkyl groups.

As the monomer (a2), commercially available products may be used. Examples of commercially available products include "TM-0701T" (one-terminal methacryloyloxyalkyl-modified organopolysiloxane, molecular weight: 423) manufactured by JNC Corporation.

The monomer (a3) is represented by the formula (III'). By using the monomer (a3) as the monomer (a), a silicon atom-containing resin that is a (meth)acrylic resin including a silicon atom-containing group represented by the formula (III) (this silicon atom-containing group is a cross-linking group crosslinking polymer main chains) is obtained.

The silicon atom-containing resin may include two or more kinds of constituent units derived from the monomer (a3).

In the formula (III') [the same applies to the formula (III)], e and h are each preferably 2 or 3.

f and g are each preferably 2 or 3.

q and s are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

r is usually greater than or equal to 3 and less than or equal to 270, preferably greater than or equal to 35 and less than or equal to 245, more preferably greater than or equal to 45 and less than or equal to 205, and still more preferably greater than or equal to 45 and less than or equal to 160, from the viewpoint of antifouling performance of the coating film, solubility in common organic solvents, and the like.

Examples of a substituent of the substituted phenyl group and substituted phenoxy group in $R^9$ to $R^{12}$ include an alkyl group and a halogen atom.

$R^9$ to $R^{12}$ are each preferably an alkyl group, more preferably an alkyl group having 1 to 6 carbon atoms, still more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and particularly preferably a methyl group or an ethyl group.

As the monomer (a3), commercially available products may be used. Examples of commercially available products include:

"FM-7711" (both-terminal methacryloyloxyalkyl-modified organopolysiloxane, molecular weight: 1,000), "FM-7721" (both-terminal methacryloyloxyalkyl-modified organopolysiloxane, molecular weight: 5,000), and "FM-7725" (both-terminal methacryloyloxyalkyl-modified organopolysiloxane, molecular weight: 10,000) manufactured by JNC Corporation; and "X-22-164" (both-terminal methacryloyloxyalkyl-modified organopolysiloxane, molecular weight: 380), "X-22-164AS" (both-terminal methacryloyloxyalkyl-modified organopolysiloxane, molecular weight: 900), "X-22-164A" (both-terminal methacryloyloxyalkyl-modified organopolysiloxane, molecular weight: 1,720), "X-22-164B" (both-terminal methacryloyloxyalkyl-modified organopolysiloxane, molecular weight: 3,200), "X-22-2445" (both-terminal acryloyloxyalkyl-modified organopolysiloxane, molecular weight: 3,200), "X-22-164C" (both-terminal methacryloyloxyalkyl-modified organopolysiloxane, molecular weight: 4,800), and "X-22-164E" (both-terminal methacryloyloxyalkyl-modified organopolysiloxane, molecular weight: 7,800) manufactured by Shin-Etsu Chemical.

The monomer (a4) is represented by the formula (IV'). By using the monomer (a4) as the monomer (a), a silicon atom-containing resin that is a (meth)acrylic resin including a silicon atom-containing group represented by the formula (IV) (this silicon atom-containing group is a cross-linking group crosslinking polymer main chains.) is obtained. As the monomer (a4), commercially available products may be used.

The silicon atom-containing resin may include two or more kinds of constituent units derived from the monomer (a4).

In the formula (IV') [the same applies to the formula (IV)], i and l are each preferably 2 or 3.

j and k are each preferably 2 or 3.

t and u are each preferably greater than or equal to 0 and less than or equal to 30, more preferably greater than or equal to 0 and less than or equal to 25, and still more preferably greater than or equal to 0 and less than or equal to 20, from the viewpoint of the water resistance, the adhesion to the substrate, and the like of the coating film. q and s may be each greater than or equal to 3 or greater than or equal to 5, and less than or equal to 10 or less than or equal to 8.

v and w are each usually greater than or equal to 0 and less than or equal to 70, preferably greater than or equal to 5 and less than or equal to 60, and more preferably greater than or equal to 10 and less than or equal to 50, from the viewpoint of antifouling performance of the coating film, solubility in common organic solvents, and the like.

Alkyl groups in $R^{13}$ to $R^{22}$ are each preferably an alkyl group having 1 to 6 carbon atoms, more preferably an alkyl group having 1 to 4 carbon atoms such as a methyl group, an ethyl group, a n-propyl group, an iso-propyl group, a n-butyl group, an iso-butyl group, a sec-butyl group, or a tert-butyl group, and still more preferably a methyl group or an ethyl group.

The monomer (a) is preferably at least one kind selected from the group consisting of the monomer (a1) and the monomer (a3) from the viewpoint of enhancing the antifouling performance and the viewpoint of easy availability of a commercial product. It is also preferable to use a combination of the monomer (a1) and the monomer (a3) as the monomer (a).

The molecular weight of the monomer (a) is preferably greater than or equal to 400, more preferably greater than or equal to 500, still more preferably greater than or equal to 1,000, yet still more preferably greater than or equal to 2,000, particularly preferably greater than or equal to 2,500, yet particularly preferably greater than or equal to 3,000, and most preferably greater than or equal to 4,000 or greater than or equal to 5,000, and may be greater than or equal to 10,000, from the viewpoint of enhancing the antifouling performance of the coating film to be obtained. The molecular weight of the monomer (a) is usually less than or equal to 20,000, preferably less than or equal to 18,000, more preferably less than or equal to 15,000, and still more preferably less than or equal to 12,000. If the molecular weight of the monomer (a) is too high, the coating film formed from the coating composition is apt to be nonuniform in distribution of components due to the immiscibility between monomers in the monomer composition which is a mixture of monomers used for preparing the silicon atom-containing resin or the immiscibility between polymers generated by polymerization of the monomer composition.

The molecular weight of the monomer (a) may be a number average molecular weight. The number average molecular weight of the monomer (a) is a number average molecular weight in terms of polystyrene measured by gel permeation chromatography (GPC).

From the viewpoint of enhancing the antifouling performance of the coating film, the content of the constituent unit (A) derived from the monomer (a) is preferably greater than or equal to 20 mass %, more preferably greater than or equal to 25 mass %, and still more preferably greater than or equal to 30 mass %, and may be greater than or equal to 35 mass %, greater than or equal to 40 mass %, or greater than or equal to 50 mass % in all constituent units contained in the silicon atom-containing resin. When the content of the constituent unit (A) is greater than or equal to 20 mass %, the coating composition can exhibit sufficient antifouling performance even when an antifouling agent is not additionally contained. From the viewpoint of coating film physical properties and uniformity of the coating film described above, the content of the constituent unit (A) is preferably less than or equal to 90 mass %, more preferably less than or equal to 80 mass %, still more preferably less than or equal to 70 mass %, and particularly preferably less than or equal to 60 mass % in all constituent units contained in the silicon atom-containing resin.

(1-3) Monomer (b)

The monomer (b) is a monomer which is a polyfunctional (meth)acrylic acid ester having two or more (meth)acryloyloxy groups. When the silicon atom-containing resin contains the constituent unit (A) derived from the monomer (a) and the constituent unit (B) derived from the monomer (b), good antifouling performance and good impact resistance can be both obtained.

The silicon atom-containing resin may include two or more kinds of constituent units (B) derived from the monomer (b).

Examples of the monomer (b) include difunctional (meth) acrylates having two (meth)acryloyloxy groups in the molecule, and tri- or more functional (meth)acrylates having three or more (meth)acryloyloxy groups in the molecule.

Examples of the difunctional (meth)acrylates include a compound (b-1) represented by a formula (b-1).

[Chemical formula 13]

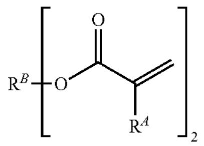

(b-1)

[In the formula, $R^A$ each independently represents a hydrogen atom or a methyl group, $R^B$ represents a divalent hydrocarbon group that may have a substituent, and at least one $—CH_2—$ of the hydrocarbon group may be replaced by —O— or —C(═O)—.]

$R^A$ is preferably a methyl group.

$R^B$ is not particularly limited, and examples thereof include an alkylene group and a poly(oxyalkylene) group. The number of carbon atoms of the alkylene group may be, for example, greater than or equal to 1 and less than or equal to 20, greater than or equal to 2 and less than or equal to 12, or greater than or equal to 3 and less than or equal to 10. The alkylene group may be linear, branched, or cyclic.

The poly(oxyalkylene) group can be represented as -(oxyalkylene group)$_x$-. x represents the number of repetitions of oxyalkylene groups, and it may be, for example, greater than or equal to 1 and less than or equal to 50, greater than or equal to 1 and less than or equal to 23, greater than or equal to 2 and less than or equal to 23, greater than or equal to 2 and less than or equal to 20, greater than or equal to 2 and less than or equal to 12, or greater than or equal to 2 and less than or equal to 10. The number of carbon atoms of the alkylene group in the oxyalkylene group may be, for example, greater than or equal to 2 and less than or equal to 6, greater than or equal to 2 and less than or equal to 4, or greater than or equal to 2 and less than or equal to 3.

Specific examples of the difunctional (meth)acrylates include ethylene glycol di(meth)acrylate, 1,3-butanediol di(meth)acrylate, 1,4-butanediol di(meth)acrylate, 1,5-pentanediol di(meth)acrylate, 3-methyl-1,5-pentanediol di(meth)acrylate, 1,6-hexanediol di(meth)acrylate, neopentyl glycol di(meth)acrylate, 1,8-octanediol di(meth)acrylate, 1,9-nonanediol di(meth)acrylate, 1,10-decanediol di(meth) acrylate, tricyclodecane dimethanol di(meth)acrylate, diethylene glycol di(meth)acrylate, triethylene glycol di(meth)acrylate, polyethylene glycol di(meth)acrylate (the number of repetitions of oxyalkylene groups is, for example, greater than or equal to 4 and less than or equal to 23), propylene glycol di(meth)acrylate, dipropylene glycol di(meth)acrylate, tripropylene glycol di(meth)acrylate, and polypropylene glycol di(meth)acrylate (the number of repetitions of oxyalkylene groups is, for example, greater than or equal to 4 and less than or equal to 23).

Examples of the tri- or more functional (meth)acrylates include glycerol tri(meth)acrylate, trimethylolpropane tri(meth)acrylate, pentaerythritol tri(meth)acrylate, pentaerythritol tetra(meth)acrylate, dipentaerythritol penta(meth)acrylate, dipentaerythritol hexa(meth)acrylate, tripentaerythritol octa(meth)acrylate, tripentaerythritol hepta(meth)acrylate, tetrapentaerythritol deca(meth)acrylate, tetrapentaerythritol nona(meth)acrylate, tris(2-(meth)acryloyloxyethyl) isocyanurate, ethylene glycol-modified pentaerythritol tetra(meth)acrylate, ethylene glycol-modified trimethylolpropane tri(meth)acrylate, ethoxylated trimethylolpropane tri(meth)acrylate, ethylene glycol-modified dipentaerythritol hexa(meth)acrylate, ethoxylated dipentaerythritol hexa(meth)acrylate, propylene glycol-modified pentaerythritol tetra(meth)acrylate, propylene glycol-modified dipentaerythritol hexa(meth)acrylate, caprolactone-modified pentaerythritol tetra(meth)acrylate, caprolactone-modified dipentaerythritol hexa(meth)acrylate, pentaerythritol triacrylate succinic acid monoester, dipentaerythritol pentaacrylate succinic acid monoester, pentaerythritol triacrylate maleic acid monoester, and dipentaerythritol pentaacrylate maleic acid monoester.

The tri- or more functional (meth)acrylate preferably has 3 to 6 functional groups, more preferably 3 or 4 functional groups.

From the viewpoint of obtaining both good antifouling performance and good impact resistance, the content of the constituent unit (B) derived from the monomer (b) is preferably greater than or equal to 0.1 mass %, more preferably greater than or equal to 0.5 mass %, and still more preferably greater than or equal to 1 mass %, and may be greater than or equal to 2 mass %, greater than or equal to 3 mass %, greater than or equal to 5 mass %, or greater than or equal to 10 mass % in all constituent units contained in the silicon atom-containing resin. The content of the constituent unit (B) is preferably less than or equal to 30 mass %, more preferably less than or equal to 25 mass %, still more preferably less than or equal to 20 mass %, yet still more preferably less than or equal to 15 mass %, particularly preferably less than or equal to 10 mass %. When the content of the constituent unit (B) is too high, the resin tends to be gelled at the time of preparation of the silicon atom-containing resin.

The ratio of the content of the constituent unit (B) to the content of the constituent unit (A) is preferably greater than or equal to 1 part by mass and less than or equal to 50 parts by mass, more preferably greater than or equal to 1 part by mass and less than or equal to 40 parts by mass, and still more preferably greater than or equal to 2 parts by mass and less than or equal to 30 parts by mass, with respect to 100 parts by mass of the content of the constituent unit (A).

(1-4) Monomer (c)

The silicon atom-containing resin can further contain the constituent unit (C) derived from the monomer (c). The monomer (c) is a monomer having a triorganosilyloxycarbonyl group. When the silicon atom-containing resin further contains the constituent unit (C) derived from the monomer (c), antifouling performance of the coating film can be further enhanced.

Examples of the triorganosilyloxycarbonyl group include a group represented by a formula (VII).

[Chemical formula 14]

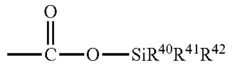

(VII)

[In the formula (VII), $R^{40}$, $R^{41}$, and $R^{42}$ are the same or different and each represent a hydrocarbon residue having 1 to 20 carbon atoms.]

The monomer (c) is preferably a monomer (c1) represented by a formula (VII').

[Chemical formula 15]

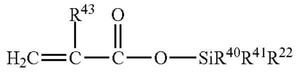

(VII')

[In the formula (VII'), $R^{43}$ represents a hydrogen atom or a methyl group, and $R^{40}$, $R^{41}$, and $R^{42}$ are the same or different and each represent a hydrocarbon group having 1 to 20 carbon atoms.]

By polymerization of the monomer composition containing the monomer (c1), a silicon atom-containing resin that is a (meth)acrylic resin including the constituent unit (C) derived from the monomer (c1) is obtained. The silicon atom-containing resin includes —C(═O)—O—$SiR^{40}R^{41}R^{42}$ as a triorganosilyloxycarbonyl group.

The silicon atom-containing resin may include two or more kinds of constituent units (C) derived from the monomer (c). For example, the silicon atom-containing resin may include two or more kinds of constituent units (C) including different triorganosilyloxycarbonyl groups.

In the formula (VII') [the same applies to the formula (VII)], $R^{40}$, $R^{41}$ and $R^{42}$ are the same or different and each represent a hydrocarbon residue having 1 to 20 carbon atoms (monovalent hydrocarbon group). Examples of the hydrocarbon residue having 1 to 20 carbon atoms include a linear or branched alkyl group having 20 or less carbon atoms such as a methyl group, an ethyl group, a n-propyl group, an iso-propyl group, a n-butyl group, an iso-butyl group, a sec-butyl group, a tert-butyl group, a pentyl group, a hexyl group, a heptyl group, an octyl group, a nonyl group, a decyl group, an undecyl group, a dodecyl group, a tridecyl group, or a tetradecyl group; a cyclic alkyl group that may have a substituent such as a cyclohexyl group or a substituted cyclohexyl group; and an aryl group that may have a substituent such as an aryl group or a substituted aryl group.

Examples of the cyclic alkyl group that has a substituent include a cyclic alkyl group substituted with a halogen, an alkyl group having up to about 18 carbon atoms, an acyl group, a nitro group, or an amino group. Examples of the aryl group that has a substituent include an aryl group substituted with a halogen, an alkyl group having up to about 18 carbon atoms, an acyl group, a nitro group, or an amino group.

Among these, it is preferable that one or more of $R^{40}$, $R^{41}$ and $R^{42}$ is an iso-propyl group, and it is more preferable that all of $R^{40}$, $R^{41}$ and $R^{42}$ are iso-propyl groups since antifouling performance of the coating film tends to be able to be stably maintained for a long period of time.

When the silicon atom-containing resin includes the constituent unit (C) derived from the monomer (c), the content of the constituent unit (C) is preferably greater than or equal to 2 mass % and less than or equal to 50 mass %, more preferably greater than or equal to 3 mass % and less than or equal to 40 mass %, still more preferably greater than or equal to 5 mass % and less than or equal to 35 mass %, and yet still more preferably greater than or equal to 5 mass % and less than or equal to 25 mass % in all constituent units contained in the silicon atom-containing resin, from the viewpoint of antifouling performance of the coating film.

When the silicon atom-containing resin includes the constituent unit (C), the ratio of the content of the constituent unit (C) to the content of the constituent unit (A) is preferably greater than or equal to 2 parts by mass and less than or equal to 100 parts by mass, more preferably greater than or equal to 5 parts by mass and less than or equal to 90 parts by mass, and still more preferably greater than or equal to 10 parts by mass and less than or equal to 80 parts by mass, and may be less than or equal to 70 parts by mass, less than or equal to 60 parts by mass, less than or equal to 50 parts by mass, or less than or equal to 40 parts by mass, with respect to 100 parts by mass of the content of the constituent unit (A).

(1-5) Monomer (d)

The silicon atom-containing resin can further contain the constituent unit (D) derived from the monomer (d). The monomer (d) is a monofunctional (meth)acrylic acid ester represented by a formula (d). When the silicon atom-containing resin further contains the constituent unit (D) derived from the monomer (d), antifouling performance of the coating film can be further enhanced. Furthermore, when the constituent unit (D) derived from the monomer (d) is further contained, a coating film consumption rate can be moderately increased.

$$CH_2{=}C(R^C)(COOR^D) \qquad (d)$$

In the formula (d), $R^C$ represents a hydrogen atom or a methyl group. $R^D$ represents a monovalent group including one or more kinds selected from the group consisting of a hydroxyl group, a carboxy group, and an oxyalkylene chain. The silicon atom-containing resin may include two or more kinds of constituent units derived from the monomer (d). The monomer (d) may be a monomer including two or more kinds of groups selected from the group consisting of a hydroxyl group, a carboxy group, and an oxyalkylene chain.

From the viewpoint of enhancing the antifouling performance of the coating film, $R^D$ of the monomer (d) preferably contains at least an oxyalkylene chain. An alkylene group included in the oxyalkylene chain may be linear or branched, and the number of carbon atoms of the alkylene group is, for example, greater than or equal to 1 and less than or equal to 24, preferably greater than or equal to 1 and less than or equal to 13, and more preferably greater than or equal to 1 and less than or equal to 6, and still more preferably 2 or 3. Examples of the alkylene group include $—CH_2—$, $—(CH_2)_2—$, $—(CH_2)_3—$, $—CH(CH_3)CH_2—$, and $—CH_2CH(CH_3)—$.

Examples of the monomer (d) include hydroxyl group-containing (meth)acrylic acid alkyl esters including an ester moiety of 1 or more and 20 or less carbon atoms, such as 2-hydroxyethyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, and 4-hydroxybutyl (meth)acrylate; carboxy group-containing (meth)acrylic acid alkyl esters including an ester moiety of 1 or more and 20 or less carbon atoms; alkoxyalkyl (meth) acrylates including an ester moiety of 1 or more and 20 or less carbon atoms, such as methoxyethyl (meth)acrylate; (meth)acrylic acid esters including an ester moiety containing a polyalkylene glycol chain, such as methoxy polyethylene glycol (meth)acrylate [the number of repetitions of $—OC_2H_4—$ is, for example, 1 to 50, preferably 1 to 24, more preferably 2 to 14, still more preferably 2 to and methoxy polypropylene glycol (meth)acrylate [the number of repetitions of $—OC_3H_6—$ is, for example, 1 to 50, preferably 1 to 24, more preferably 2 to 14, still more preferably 2 to 9]; and (meth)acrylic acid esters including an ester moiety containing a polyalkylene glycol chain and a carboxy group, such as (meth)acryloyloxyethylsuccinic acid, (meth)acryloyloxyethylphthalic acid, (meth)acryloyloxyethylhexahydrophthalic acid, (meth)acryloyloxypropylphthalic acid, and (meth)acryloyloxypropylhexahydrophthalic acid.

Among the above, the monomer (d) is preferably a (meth)acrylic acid alkoxyalkyl including an ester moiety having 1 or more and 20 or less carbon atoms, a (meth) acrylic acid ester including an ester moiety containing a polyalkylene glycol chain, and/or a (meth)acrylic acid ester including an ester moiety containing a polyalkylene glycol chain and a carboxy group.

When the silicon atom-containing resin includes the constituent unit (D) derived from the monomer (d), the content of the constituent unit (D) is preferably greater than or equal to 0.1 mass % and less than or equal to 40 mass %, more preferably greater than or equal to 0.5 mass % and less than or equal to 35 mass %, and still more preferably greater than or equal to 1 mass % and less than or equal to 30 mass %, and may be less than or equal to 25 mass %, less than or equal to 20 mass %, less than or equal to 15 mass %, or less than or equal to 10 mass % in all constituent units contained in the silicon atom-containing resin, from the viewpoint of antifouling performance of the coating film.

When the silicon atom-containing resin includes the constituent unit (D), the ratio of the content of the constituent unit (D) to the content of the constituent unit (A) is preferably greater than or equal to 0.5 parts by mass and less than or equal to 80 parts by mass, more preferably greater than or equal to 1 part by mass and less than or equal to 70 parts by mass, still more preferably greater than or equal to 1 part by mass and less than or equal to 60 parts by mass, and yet still more preferably greater than or equal to 2 parts by mass and less than or equal to 50 parts by mass, and may be less than or equal to 45 parts by mass, less than or equal to 40 parts by mass, less than or equal to 30 parts by mass, or less than or equal to 20 parts by mass, with respect to 100 parts by mass of the content of the constituent unit (A).

(1-6) Monomer (e)

The silicon atom-containing resin may further include a constituent unit (E) derived from a monomer (e) including at least one kind of metal atom-containing group selected from the group consisting of a group represented by the formula (V) and a group represented by the formula (VI). When the silicon atom-containing resin further includes the constituent unit (E), antifouling performance of the coating film can be further enhanced.

The silicon atom-containing resin may include both a group represented by the formula (V) and a group represented by the formula (VI).

The monomer (e) is preferably at least one kind selected from the group consisting of a monomer (e1) represented by the formula (V') and a monomer (e2) represented by the formula (VI').

[Chemical formula 16]

(V')

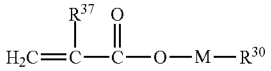

[In the formula (V'), $R^{37}$ represents a hydrogen atom or a methyl group, and M and $R^{30}$ represent the same meaning as previously mentioned.]

[Chemical formula 17]

(VI')

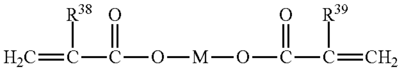

[In the formula (VI'), $R^{38}$ and $R^{39}$ each independently represent a hydrogen atom or a methyl group, and M represents the same meaning as previously mentioned.]

By polymerization of the monomer composition containing the monomer (e), a silicon atom-containing resin that is a (meth)acrylic resin including the constituent unit (E) derived from the monomer (e) selected from the group consisting of the monomer (e1) and the monomer (e2) is obtained. This silicon atom-containing resin includes at least one kind of metal atom-containing group selected from the group consisting of a group represented by the formula (V) and a group represented by the formula (VI).

The silicon atom-containing resin may include two or more kinds of constituent units (E) derived from the monomer (e).

The divalent metal atom M in the formula (V') [the same applies to formula (V)] and the formula (VI') [the same applies to formula (VI)] is, for example, Mg, Zn, or Cu, and is preferably Zn or Cu.

In the formula (V') [the same applies to formula (V)], $R^{30}$ is preferably an organic acid residue.

The monomer (e1) is represented by the formula (V'). By using the monomer (e1) as the monomer (e), a silicon atom-containing resin that is a (meth)acrylic resin further including a metal atom-containing group represented by the formula (V) is obtained.

In $R^{30}$, as an organic acid forming an organic acid residue, for example, monobasic organic acids such as acetic acid, monochloroacetic acid, monofluoroacetic acid, propionic acid, caproic acid, caprylic acid, 2-ethylhexyl acid, capric acid, versatic acid, isostearic acid, palmitic acid, cresotinic acid, oleic acid, elaidic acid, linoleic acid, linolenic acid, stearolic acid, ricinoleic acid, ricinoelaidic acid, brassidic acid, erucic acid, $\alpha$-naphthoic acid, $\beta$-naphthoic acid, benzoic acid, 2,4,5-trichlorophenoxyacetic acid, 2,4-dichlorophenoxyacetic acid, quinoline carboxylic acid, nitrobenzoic acid, nitronaphthalenecarboxylic acid, and pyruvic acid are recited.

Particularly, it is preferable that the organic acid residue is a fatty acid residue because a coating film without cracking and peeling tends to be kept for a long period of time. In particular, zinc oleate (meth)acrylate or zinc versatate (meth)acrylate having high flexibility is preferably used as the monomer (e1).

As other preferred organic acids, monobasic cyclic organic acids other than aromatic organic acids can be recited. Examples of the monobasic cyclic organic acids include: organic acids including a cycloalkyl group, such as naphthenic acid; resin acids, such as tricyclic resin acids; and salts thereof.

Examples of the tricyclic resin acids include monobasic acids including a diterpene hydrocarbon skeleton. Examples of the monobasic acids including a diterpene hydrocarbon skeleton include compounds including an abietane, pimarane, isopimarane, or labdane skeleton. More specifically, examples thereof include abietic acid, neoabietic acid, dehydroabietic acid, hydrogenated abietic acid, parastrinic acid, pimaric acid, isopimaric acid, levopimaric acid, dextropimaric acid, sandaracopimaric acid, and salts thereof. Among these, abietic acid, hydrogenated abietic acid, and salts thereof are preferable from the viewpoint of antifouling performance of the coating film and the like.

As the monobasic cyclic organic acid, for example, pine resin, resin acid of pine and the like may be used. Examples of such things include rosins, hydrogenated rosins, disproportionated rosins, and naphthenic acid. The rosins include gum rosin, wood rosin, tall oil rosin, and the like. The rosins, the hydrogenated rosins, and the disproportionated rosins are preferable from the viewpoints of being inexpensive and easily available, being excellent in handleability, and easily improving antifouling performance.

The acid value of the monobasic cyclic organic acid is preferably greater than or equal to 100 mgKOH/g and less than or equal to 220 mgKOH/g, more preferably greater than or equal to 120 mgKOH/g and less than or equal to 190 mgKOH/g, and still more preferably greater than or equal to 140 mgKOH/g and less than or equal to 185 mgKOH/g.

When a monobasic cyclic organic acid having an acid value within the above range is used as the monobasic cyclic organic acid forming $R^{30}$, good antifouling performance of the coating film tends to be able to be maintained for a longer period of time.

An organic acid residue of the monomer (e1) may be formed of only one kind of organic acid or two or more kinds of organic acids.

Examples of a production method of the monomer (e1) including an organic acid residue as $R^{30}$ include a method of reacting an inorganic metal compound, with a carboxyl group-containing radical polymerizable monomer such as (meth)acrylic acid, and a nonpolymerizable organic acid (an organic acid forming the organic acid residue) in an organic solvent containing an alcoholic compound.

The constituent unit (E) derived from the monomer (e1) may also be formed by a method of reacting a resin obtainable by polymerization of a monomer composition including a carboxyl group-containing radical polymerizable monomer such as (meth)acrylic acid, with a metal compound, and a nonpolymerizable organic acid (an organic acid forming the organic acid residue).

The monomer (e2) is represented by the formula (VI'). By using the monomer (e2) as the monomer (e), a silicon atom-containing resin that is a (meth)acrylic resin further including a metal atom-containing group represented by the formula (VI) (this metal atom-containing group is a crosslinking group crosslinking polymer main chains) is obtained.

Examples of the monomer (e2) include magnesium acrylate $[(CH_2{=}CHCOO)_2Mg]$, magnesium methacrylate $[(CH_2{=}C(CH_3)COO)_2Mg]$, zinc acrylate $[(CH_2{=}CHCOO)_2Zn]$, zinc methacrylate $[(CH_2{=}C(CH_3)COO)_2Zn]$, copper acrylate $[(CH_2{=}CHCOO)_2Cu]$, and copper methacrylate $[(CH_2{=}C(CH_3)COO)_2Cu]$. One or two or more of these can be appropriately selected and used as necessary.

Examples of a production method of the monomer (e2) include a method of reacting a polymerizable unsaturated organic acid such as (meth)acrylic acid with a metal compound in an organic solvent containing an alcoholic compound together with water. In this case, the content of water in the reactants is preferably adjusted to greater than or equal to 0.01% by mass and less than or equal to 30% by mass.

The silicon atom-containing resin may include both of a constituent unit derived from the monomer (e1) and a constituent unit derived from the monomer (e2).

In the case where the silicon atom-containing resin includes the constituent unit (E), from the viewpoint of antifouling performance of the coating film and the like, the content of the constituent unit (E) is preferably greater than or equal to 1 mass % and less than or equal to 30 mass %, more preferably greater than or equal to 2 mass % and less than or equal to 25 mass %, and still more preferably greater than or equal to 4 mass % and less than or equal to 20 mass % in all constituent units contained in the silicon atom-containing resin.

When the silicon atom-containing resin includes the constituent unit (E), the ratio of the content of the constituent unit (E) to the content of the constituent unit (A) is preferably greater than or equal to 0.5 parts by mass and less than or equal to 50 parts by mass, more preferably greater than or equal to 1 part by mass and less than or equal to 40 parts by mass, still more preferably greater than or equal to 2 parts by mass and less than or equal to 35 parts by mass, and yet still more preferably greater than or equal to 5 parts by mass and less than or equal to 30 parts by mass, and may be less than or equal to 25 parts by mass, less than or equal to 20 parts by mass, or less than or equal to 15 parts by mass, with respect to 100 parts by mass of the content of the constituent unit (A).

(1-7) Other Monomer

The silicon atom-containing resin may include a constituent unit (F) derived from a monomer (f) other than the above. The silicon atom-containing resin may include two or more kinds of constituent units (F).

The other monomer (f) is not particularly limited as long as it is an unsaturated monomer copolymerizable with the monomers (a) to (e), and examples thereof include:

- (meth)acrylic acid ester monomers not belonging to the monomers (b) and (d), such as methyl (meth)acrylate, ethyl (meth)acrylate, 2-methoxyethyl (meth)acrylate, 2-ethoxyethyl (meth)acrylate, phenoxyethyl (meth) acrylate, 2-(2-ethylhexaoxy)ethyl (meth)acrylate, 1-methyl-2-methoxyethyl (meth)acrylate, 3-methoxybutyl (meth)acrylate, 3-methyl-3-methoxybutyl (meth) acrylate, m-methoxyphenyl (meth)acrylate, p-methoxyphenyl (meth)acrylate, o-methoxyphenylethyl (meth)acrylate, m-methoxyphenylethyl (meth) acrylate, p-methoxyphenylethyl (meth)acrylate, n-propyl (meth)acrylate, iso-propyl (meth)acrylate, n-butyl (meth)acrylate, iso-butyl (meth)acrylate, tert-butyl (meth)acrylate, 2-ethylhexyl (meth)acrylate, lauryl (meth)acrylate, stearyl (meth)acrylate, benzyl (meth) acrylate, phenyl (meth)acrylate, isobornyl (meth)acrylate, cyclohexyl (meth)acrylate, and glycidyl (meth) acrylate;
- vinyl monomers containing a primary or secondary amino group, such as butylaminoethyl (meth)acrylate and (meth)acrylamide;
- vinyl monomers containing a tertiary amino group, such as dimethylaminoethyl (meth)acrylate, diethylaminoethyl (meth)acrylate, dimethylaminopropyl (meth) acrylate, dimethylaminobutyl (meth)acrylate, dibutylaminoethyl (meth)acrylate, dimethylaminoethyl (meth)acrylamide, and dimethylaminopropyl (meth) acrylamide;
- heterocyclic basic monomers, such as vinylpyrrolidone, vinylpyridine, and vinylcarbazole; and
- other vinyl-type monomers, such as styrene, vinyltoluene, α-methylstyrene, (meth)acrylonitrile, vinyl acetate, and vinyl propionate.

The silicon atom-containing resin preferably includes methyl methacrylate.

In the case where the silicon atom-containing resin includes the constituent unit (F), the content of the constituent unit (F) is usually greater than or equal to 0.1 mass % and less than or equal to 85 mass %, preferably greater than or equal to 1 mass % and less than or equal to 80 mass %, more preferably greater than or equal to 5 mass % and less than or equal to 75 mass %, still more preferably greater than or equal to 10 mass % and less than or equal to 70 mass %, and yet still more preferably greater than or equal to 20 mass % and less than or equal to 70 mass % in all constituent units contained in the silicon atom-containing resin. When the content of the constituent unit (F) is greater than or equal to 0.1% by mass, it is possible to balance various properties of the resulting coating composition and coating film. When the content of the constituent unit (F) is less than or equal to 85 mass %, a coating film that exhibits sufficient antifouling performance can be formed even when an antifouling agent is not separately contained.

(1-8) Glass Transition Temperature and Molecular Weight of Silicon Atom-Containing Resin The glass transition temperature (Tg) of the silicon atom-containing resin is greater than or equal to 0° C. and less than or equal to 80° C., for example. From the viewpoint of enhancing the impact resistance of the coating film, Tg of the silicon atom-containing resin is preferably greater than or equal to 10° C. and less than or equal to 70° C., more preferably greater than or equal to 20° C. and less than or equal to 60° C. In addition, from the viewpoint of reducing tackiness of the coating film, Tg of the silicon atom-containing resin is preferably greater than or equal to 20° C., more preferably greater than or equal to 30° C.

In the present description, the glass transition temperature is a temperature measured in conformity with JIS K 7121, with the use of a differential scanning calorimeter (DSC).

The number average molecular weight of the silicon atom-containing resin is usually greater than or equal to 2,000 and less than or equal to 100,000, preferably greater than or equal to 3,000 and less than or equal to 50,000, and more preferably greater than or equal to 5,000 and less than or equal to 30,000. When the number average molecular weight of the silicon atom-containing resin is greater than or equal to 2,000, the coating film formed from the coating composition tends to be able to develop antifouling performance. When the number average molecular weight of the silicon atom-containing resin is less than or equal to 100,000, there is a tendency that the silicon atom-containing resin is likely to be uniformly dispersed in the coating composition. The number average molecular weight of the silicon atom-containing resin is a number average molecular weight in terms of polystyrene measured by gel permeation chromatography (GPC).

(1-9) Method of Producing Silicon Atom-Containing Resin

The production method of the silicon atom-containing resin is not particularly limited, and for example, a method of reacting a monomer composition of the aforementioned monomers in the presence of a radical initiator at a reaction temperature of 60 to 180° C. for 5 to 14 hours. Conditions of the polymerization reaction may be appropriately adjusted.

As the radical initiator, for example, 2,2-azobisisobutyronitrile, 2,2-azobis(2,4-dimethylvaleronitrile), 2,2-azobis (2-methylbutyronitrile), benzoyl peroxide, cumene hydroperoxide, lauryl peroxide, di-tert-butylperoxide, tert-butylperoxy-2-ethylhexanoate and the like are recited.

Examples of a polymerization method include a solution polymerization method, an emulsion polymerization method, and a suspension polymerization method that are carried out in an organic solvent. From the viewpoint of production efficiency and the like of the silicon atom-containing resin, the solution polymerization method is preferable. Examples of the organic solvent include common organic solvents such as toluene, xylene, methyl isobutyl ketone, and n-butyl acetate.

(1-10) Content of Silicon Atom-Containing Resin

The content of the silicon atom-containing resin in the coating composition is preferably greater than or equal to 25 mass % and less than or equal to 99 mass %, more preferably greater than or equal to 30 mass % and less than or equal to 98 mass %, and still more preferably greater than or equal to 35 mass % and less than or equal to 97 mass %, and may be less than or equal to 90 mass %, less than or equal to 80 mass %, or less than or equal to 70 mass %, in the solid content contained in the coating composition. When the content of the silicon atom-containing resin is less than 25% by mass, the antifouling property and the adhesion of the coating film to the substrate tend to decrease. The solid content contained in the coating composition refers to the sum of the ingredients other than a solvent contained in the coating composition.

(2) Other Ingredients that May be Contained in Coating Composition

The coating composition can contain one or two or more kinds of other ingredients than the silicon atom-containing resin. Examples of the other ingredients include additives such as a defoaming agent, an anti-sagging agent, a plasticizer, an antifouling agent, a water binder, a color separation inhibitor, an anti-settling agent, a coating film exhaustion conditioner, a UV absorber, a surface conditioner, a viscosity conditioner, a leveling agent, and a pigment disperser, pigments, and solvents. These additives, pigments, and solvents may be used singly or in combination of two or more kinds thereof.

A defoaming agent is an agent having a function of making the surface of foam to be formed nonuniform and suppressing the formation of foam, or an agent having a function of locally thinning the surface of formed foam and breaking the foam. Examples of the defoaming agent include silicon-based defoaming agents and non-silicon-based defoaming agents. The silicon-based defoaming agent is a defoaming agent containing a polysiloxane having surface activity or a modified product thereof, and the non-silicon-based defoaming agent is a defoaming agent other than a silicon-based defoaming agent (defoaming agent not containing polysiloxane or a modified product thereof). The silicon-based defoaming agent may be a fluorine-modified silicon-based defoaming agent. The fluorine-modified silicon-based defoaming agent is a defoaming agent containing a fluorine-modified polysiloxane.

Examples of the non-silicon-based defoaming agent include higher alcohol-based, higher alcohol derivative-based, fatty acid-based, fatty acid derivative-based, paraffin-based, (meth)acrylic polymer-based, and mineral oil-based defoaming agents. Examples of the silicon-based defoaming agent include types such as oil types, compound types, self-emulsifying types, and emulsion types.

As a defoaming agent, a commercially available product may be used. Examples of commercially available non-silicon-based defoaming agents include mineral oil-based defoaming agents such as "BYK-030" manufactured by BYK; and polymer-based defoaming agents such as "Disparlon OX68" manufactured by Kusumoto Chemicals, and "BYK-1790" manufactured by BYK. Examples of commercially available silicon-based defoaming agents other than fluorine-modified silicon-based defoaming agents include silicone oil-based defoaming agents such as "KF-96" manufactured by Shin-Etsu Chemical, and "BYK-081" manufactured by BYK. Examples of commercially available fluorine-modified silicon-based defoaming agents include fluorosilicone oil-based defoaming agents such as "BYK-063", "BYK-065", and "BYK-066N" manufactured by BYK, and "FA-630" manufactured by Shin-Etsu Chemical.

The content of the defoaming agent is greater than or equal to 0.002 parts by mass and less than or equal to 0.60 parts by mass, more preferably greater than or equal to 0.004 parts by mass and less than or equal to 0.55 parts by mass, still more preferably greater than or equal to 0.01 parts by mass and less than or equal to 0.40 parts by mass, and yet still more preferably greater than or equal to 0.01 parts by mass and less than or equal to 0.20 parts by mass, with respect to 100 parts by mass of the silicon atom-containing resin, from the viewpoint of improving the defoaming property.

The anti-sagging agent is an agent having a function of suppressing the occurrence of sagging of the coating composition that may occur during a time from the application of the coating composition to an object to be coated until the completion of drying of the coating film. Examples of the anti-sagging agent include an amide-based anti-sagging agent; bentonite-based anti-sagging agent; polyethylene wax such as oxidized polyethylene wax; hydrogenated castor oil wax; a long chain fatty acid ester-based polymer; polycarboxylic acid; a silica fine particle-based anti-sagging agent; and a mixture of two or more kinds thereof.

Examples of the amide-based anti-sagging agent include amide wax-based anti-sagging agents such as fatty acid amide wax and polyamide wax. Examples of the fatty acid amide wax include stearic acid amide wax and oleic acid amide wax.

As the anti-sagging agent, a commercially available product may be used. Examples of the commercially available product of the amide wax-based anti-sagging agent include "Tarene 7200-20" manufactured by Kyoeisha Chemical, and "Disparlon 6900-20X" and "Disparlon RE-8000" manufactured by Kusumoto Chemicals, and "Monoral 3300" manufactured by HS CHEM. Examples of other commercially available products of the anti-sagging agent include organic bentonite-based anti-sagging agents such as "Bentone 38" manufactured by Elementis Japan KK and "TIXOGEL" manufactured by BYK.

The content of the anti-sagging agent is greater than or equal to 0.1 parts by mass and less than or equal to 6.0 parts by mass, more preferably greater than or equal to 0.2 parts by mass and less than or equal to 5.0 parts by mass, and still more preferably greater than or equal to 0.25 parts by mass and less than or equal to 4.0 parts by mass, with respect to 100 parts by mass of the silicon atom-containing resin, from the viewpoint of improving the anti-sagging property.

The coating composition may contain a plasticizer. By adding the plasticizer, the crack resistance of the coating film can be improved. The addition of the plasticizer makes it possible to control the polishing rate (polishing speed) of the coating film to an appropriate speed, whereby it can be advantageous also in terms of the antifouling performance.

Examples of the plasticizer include chlorinated paraffin; chlorinated polyolefins such as chlorinated rubber, chlorinated polyethylene, and chlorinated polypropylene; polyvinyl ether; polypropylene sebacate; partially hydrogenated terphenyl; polyvinyl acetate; poly (meth)acrylic acid alkyl esters such as a methyl (meth)acrylate copolymer, an ethyl (meth)acrylate copolymer, a propyl (meth)acrylate copolymer, a butyl (meth)acrylate copolymer, and a cyclohexyl (meth)acrylate copolymer; polyether polyol; alkyd resins; polyester resins; vinyl chloride-based resins such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, and a vinyl chloride-ethyl vinyl ether copolymer; silicone oils; oil and fat, and purified products thereof (wax, castor oil, and the like); petrolatum; liquid paraffin; rosin, hydrogenated rosin, naphthenic acid, fatty acid, and divalent metal salts thereof, phthalate esters such as dioctyl phthalate (DOP), dimethyl phthalate, dicyclohexyl phthalate, and diisodecyl phthalate (DIDP); aliphatic dibasic acid esters such as isobutyl adipate and dibutyl sebacate; glycol esters such as diethylene glycol dibenzoate and pentaerythritol alkyl ester; phosphoric acid esters such as tricresyl phosphoric acid (tricresyl phosphate), triaryl phosphoric acid (triaryl phosphate), and trichloroethyl phosphoric acid; epoxy compounds such as epoxy soybean oil and octyl epoxystearate; organotin compounds such as dioctyltin laurate and dibutyltin laurate; and trioctyl trimellitic acid, and triacetylene.

Among them, chlorinated paraffin, polyvinyl ether, polyether polyol, rosin, a vinyl chloride-isobutyl vinyl ether copolymer, phthalic acid ester, and phosphoric acid ester are preferable from the viewpoint of compatibility with the silicon atom-containing resin and crack resistance of the coating film.

The content of the plasticizer in the coating composition is preferably greater than or equal to 3 parts by mass and less than or equal to 100 parts by mass, more preferably greater than or equal to 5 parts by mass and less than or equal to 50 parts by mass, and still preferably greater than or equal to 5 parts by mass and less than or equal to 40 parts by mass, with respect to 100 parts by mass of the silicon atom-containing resin. When the content of the plasticizer falls within the above-mentioned range, the antifouling property and the crack resistance of the coating film to be obtained is enhanced, which is an advantage.

Since the coating film formed from the coating composition of the present invention can exhibit good antifouling performance due to the antifouling effect based on the silicon atom-containing resin, the coating film is not necessarily required to contain an antifouling agent separately from the silicon atom-containing resin.

However, in order to further enhance the antifouling performance or to further enhance the long-term sustainability of the antifouling performance, an antifouling agent may be contained in the coating composition as necessary. As the antifouling agent, those known in the art may be used without particular limitation, and for example, inorganic compounds, organic compounds containing a metal, and organic compounds not containing a metal can be recited.

Examples of the antifouling agent include zinc oxide; cuprous oxide; manganese ethylene-bis-dithiocarbamate; zinc dimethyldithiocarbamate; 2-methylthio-4-t-butylamino-6-cyclopropylamino-s-triazine; 2,4,5,6-tetrachloroisophthalonitrile; N,N-dimethyldichlorophenyl urea; zinc ethylene-bis-dithiocarbamate; rhodan copper (cuprous thiocyanate); 4,5-dichloro-2-n-octyl-4-isothiazolin-3-one (4,5,-dichloro-2-n-octyl-3(2H)isothiazolone); N-(fluorodichloromethylthio)phthalimide; N,N‘-dimethyl-N’-phenyl-(N-fluorodichloromethylthio)sulfamide; metal salts of pyrithione such as 2-pyridinethiol-1-oxide zinc salt (zinc pyrithione) and copper salt (copper pyrithione); tetramethylthiuram disulfide; 2,4,6-trichlorophenyl maleimide; 2,3,5,6-tetrachloro-4-(methylsulfonyl)pyridine; 3-iodo-2-propylbutyl carbamate; diiodomethyl-para-trisulfone; phenyl (bispyridyl)bismuth dichloride; 2-(4-thiazolyl)-benzimidazole; triphenylboronpyridine salt; stearylamine-triphenylboron; laurylamine-triphenylboron; bis dimethyl dithiocarbamoyl zinc ethylenebisdithiocarbamate; 1,1-dichloro-N-[(dimethylamino)sulfonyl]-1-fluoro-N-phenyl-methanesulfenamide; 1,1-dichloro-N-[(dimethylamino) sulfonyl]-1-fluoro-N-(4-methylphenyl) methanesulfeneamide; N'-(3,4-dichlorophenyl)-N,N'-dimethyl urea; N'-t-butyl-N-cyclopropyl-6-(methylthio)-1,3,5-triazine-2,4-diamine; and 4-bromo-2-(4-chlorophenyl)-5-(trifluoromethyl)-1H-pyrrole-3-carbonitrile; 4-[1-(2,3-dimethylphenyl)ethyl]-1H-imidazole (general name: medetomidine).

Among these, the antifouling agent is preferably at least one kind selected from the group consisting of cuprous oxide, pyrithione metal salt, 4,5-dichloro-2-n-octyl-4-isothiazolin-3-one, 2-methylthio-4-t-butylamino-6-cyclopropylamino-s-triazine, 4-bromo-2-(4-chlorophenyl)-5-(trifluoromethyl)-1H-pyrrole-3-carbonitrile, and medetomidine.

When the coating composition includes an antifouling agent, the content of the antifouling agent in the coating composition is preferably greater than or equal to 0.1 parts by mass, and more preferably 0.2 parts by mass, and may be greater than or equal to 0.5 parts by mass, greater than or equal to 1 part by mass, or greater than or equal to 5 parts by mass, with respect to 100 parts by mass of the silicon atom-containing resin. The content of the antifouling agent in the coating composition is preferably less than or equal to 150 parts by mass, more preferably less than or equal to 120 parts by mass, and still more preferably less than or equal to 100 parts by mass, and may be less than or equal to 80 parts by mass, less than or equal to 60 parts by mass, less than or equal to 50 parts by mass, less than or equal to 40 parts by mass, less than or equal to 30 parts by mass, less than or equal to 20 parts by mass, or less than or equal to 10 parts by mass, with respect to 100 parts by mass of the silicon atom-containing resin. When the content of the antifouling agent falls within the above-mentioned range, the antifouling performance can be further enhanced and the long-term sustainability of the antifouling performance can be further enhanced, without adversely affecting various performances of the coating film to be obtained.

As the pigment, for example, extender pigments such as sedimentary barium, talc, clay, chalk, silica white, alumina white, bentonite, calcium carbonate, magnesium carbonate, silicic acid, silicates, aluminum oxide hydrates and calcium sulfate; and coloring pigments such as titanium oxide, zircon oxide, basic lead sulfate, tin oxide, carbon black, white lead, graphite, zinc sulfide, zinc oxide, chromic oxide, yellow nickel titanium, yellow chromium titanium, yellow iron oxide, red iron oxide (rouge), black iron oxide, azoic red and yellow pigment, chromium yellow, phthalocyanine green, phthalocyanine blue, ultramarine blue and quinacridone can be recited.

As the solvent, for example, hydrocarbons such as toluene, xylene, ethylbenzene, cyclopentane, octane, heptane, cyclohexane and white spirit; ethers such as dioxane, tetrahydrofuran, ethylene glycol monomethyl ether, ethylene glycol monoethyl ether, ethylene glycol monobutyl ether, ethylene glycol dibutyl ether, diethylene glycol monomethyl ether, diethylene glycol monoethyl ether and butyl cellosolve; esters such as butyl acetate, propyl acetate, benzyl acetate, ethylene glycol monomethyl ether acetate and ethylene glycol monoethyl ether acetate; ketones such as ethylisobutyl ketone and methylisobutyl ketone; alcohols such as n-butanol and propyl alcohol; and the like can be recited.

(3) Preparation of Coating Composition

The coating composition can be prepared, for example, by adding, to the silicon atom-containing resin or a resin composition containing the same (for example, a solution or dispersion containing the silicon atom-containing resin), as necessary, other ingredients, and mixing them by using a mixer such as a ball mill, a pebble mill, a roll mill, a sand grind mill, or a high speed disperser.

<Antifouling Coating Film and Composite Coating Film>

The antifouling coating film according to the present invention (hereinafter, also simply referred to as "coating film") is a coating film formed from the antifouling coating composition according to the present invention. The coating film is an antifouling coating film having antifouling performance. Since the coating film is formed from the antifouling coating composition according to the present invention, the coating film can exhibit good antifouling performance and good impact resistance.

The coating film can be formed by applying the coating composition on a surface of an object to be coated according to a routine method, and then removing a solvent by volatilization at room temperature or under heating as necessary. Examples of an application method of the coating composition include conventionally known methods such as immersion method, spray method, brush coating, roller, electrostatic coating, and electrodeposition coating. The thickness of the coating film is, for example, greater than or equal to 50 μm and less than or equal to 500 μm, and preferably greater than or equal to 100 μm and less than or equal to 400 μm.

Examples of the object to be coated include a ship and an in-water structure. Examples of the in-water structure include various fish nets such as fish nets for farming and other fishing equipment; harbor facilities; oilfences; intake equipment of an electric generation plant or the like; piping such as water conduits for cooling; bridges, buoyage; industrial water system facilities; and submarine bases. The object to be coated is preferably an underwater moving body, and examples of the underwater moving body include ships, fishing nets, and fishing equipment.

An application surface of the object to be coated may be pretreated as necessary, or on a primer film of another coating composition such as an antirust coating composition (anticorrosion coating composition) formed on an object to be coated, a coating film formed from the coating composition of the present invention may be formed to produce a composite film.

According to the coating composition of the present invention, the silicon atom-containing resin itself serving as a vehicle can exhibit good antifouling performance, which makes it possible to eliminate the addition of antifouling agent, or to reduce the amount of addition thereof. Therefore, according to the coating composition of the present invention, it is possible to form a clear (highly transparent) antifouling coating film.

For example, in the composite film including a primer film formed from an antirust coating composition or the like and a coating film of the present invention formed on the primer film, by using a clear antifouling film as the coating film of the present invention and those having various color phases as the antirust coating composition, it is possible to provide a coated object such as a ship having a composite film-formed surface having a color phase that is not conventionally realized, while having antifouling performance. Also by forming an intermediate film of a paint having various color phases between the primer film of an antirust coating composition or the like and the clear antifouling film, it is possible to provide a coated object having a color phase that is not conventionally realized.

As the coating composition forming the intermediate film, for example, various coating compositions such as an antifouling coating composition, an epoxy resin coating composition, a urethane resin coating composition, a (meth) acrylic resin coating composition, a chlorinated rubber coating composition, an alkyd resin coating composition, a silicon resin coating composition, and a fluorine resin coating composition may be used. The antifouling coating composition forming the intermediate film may be the coating composition of the present invention, or a different antifouling coating composition such as a conventional antifouling coating composition containing a relatively large amount of antifouling agent.

The intermediate film may be formed on the entire surface of the primer film, or may be formed on part of the surface. The intermediate film and the primer film may be a used old coating film. In this case, the coating composition of the present invention and a coating film formed therefrom may be used for repairing the old coating film.

EXAMPLES

The present invention will be described below in more detail by way of examples and comparative examples, but the present invention is not limited thereto.

Resin Production Example S1: Production of Silicon Atom-Containing Resin (S1)

To a four-necked flask equipped with a thermometer, a condenser, a stirrer, a dropping funnel, a nitrogen inlet tube, and a temperature controller, 80.0 parts by mass of xylene was added as a solvent and maintained at 95° C. A mixture liquid obtained by mixing in advance 40.0 parts by mass of KF-2012 as the monomer (a), 1.0 part by mass of NPG as the monomer (b), 15.0 parts by mass of t-BMA, 30.0 parts by mass of n-BMA, and 14.0 parts by mass of MMA as the monomer (f), 10.0 parts by mass of xylene as a solvent, and 1.1 parts by mass of tert-butylperoxy-2-ethylhexanoate as a radical polymerization initiator was added to the dropping funnel and added dropwise to the four-necked flask at a constant velocity over 3 hours, and after completion of the dropwise addition, incubated for 60 minutes. Then, a mixture liquid consisting of 10.0 parts by mass of xylene and 0.2 parts by mass of tert-butylperoxy-2-ethylhexanoate was added dropwise to the four-necked flask at a constant velocity over 30 minutes, and after completion of the dropwise addition, incubated for 1.5 hours, to obtain a resin composition (solution) including a silicon atom-containing resin (S1).

Resin Production Examples S2 to S13: Production of Silicon Atom-Containing Resins (S2) to (S13)

Resin compositions (solutions) including silicon atom-containing resins (S2) to (S13) were obtained in the same manner as in Production Example S1 except that the type and the amount of the monomer were changed as specified in Table 1 or Table 2.

Resin Production Examples T1 to T12: Production of Silicon Atom-Containing Resins (T1) to (T12)

Resin compositions (solutions) including resins (T1) to (T12) were obtained in the same manner as in Production Example S1 except that the type and the amount of the monomer were changed as specified in Table 3 or Table 4.

Hereinafter, resins obtained in the resin production examples S1 to S13 are also respectively referred to as "resins S1 to S13", and resin compositions (solutions) obtained in the resin production examples S1 to S13 are also respectively referred to as "resin compositions S1 to S13". Resins obtained in the resin production examples T1 to T12 are also respectively referred to as "resins T1 to T12", and resin compositions (solutions) obtained in the resin production examples T1 to T12 are also respectively referred to as "resin compositions T1 to T12".

Monomers used in the resin production examples S1 to S13 and T1 to T12 and use amounts (parts by mass) thereof are shown in Table 1 to Table 4.

The glass transition temperature (Tg) and the number average molecular weight (Mn) of the obtained resins S1 to S13 and T1 to T12, and the solid content concentration of the obtained resin compositions S1 to S13 and T1 to T12 were measured. The results are also shown in Table 1 to Table 4. The measurement methods are as described below.

[i] Glass Transition Temperature (Tg)

The glass transition temperature (Tg) of the resin was measured in conformity with JIS K 7121 with the use of a differential scanning calorimeter (DSC). Measurement conditions were set as described below.

Apparatus: "Differential Scanning Calorimeter SII X-DSC7000" manufactured by Hitachi High-Tech Science Sample amount: 5.00 mg Reference: $Al_2O_3$ (aluminum oxide)

Sample container: Aluminum pan

Measurement temperature range: −50 to 150° C.

Temperature raising rate: 10° C./min

[ii] Number Average Molecular Weight (Mn)

The number average molecular weight (Mn) of each of the monomer (a) and the resin is a number average molecular weight in terms of polystyrene measured by GPC. Measurement conditions were set as described below.

Apparatus: "HLC-8220GPC" manufactured by Tosoh Corporation

Column: TSKgel SuperHZM-M×2 columns

Eluent: tetrahydrofuran

Measurement temperature: 35° C.

Detector: RI

[iii] Solid Content Concentration

The solid content concentration of the resin composition was calculated according to the following equation.

Solid content concentration (% by mass)=100×(total mass of raw materials used for preparation of resin composition excluding solvent)/(mass of resin composition obtained)

TABLE 1

| Resin production example | | S1 | S2 | S3 | S4 | S5 | S6 | S7 |
|---|---|---|---|---|---|---|---|---|
| Monomer (a) | FM-0721 | | | | 40.0 | | 10.0 | |
| | FM-0725 | | 25.0 | | | | 5.0 | |
| | KF-2012 | 40.0 | | | | 40.0 | | 40.0 |
| | X-22-2426 | | | | | | | |
| | FM-7721 | | | | | | | |
| | FM-7725 | | | | 5.0 | | | |
| | X-22-164B | | | | | | 5.0 | |
| | X-22-164E | | | | | | | |
| | FM-0711 | | | 50.0 | | 5.0 | 25.0 | |
| | X-22-174ASX | | | | | | | |
| | X22-174BX | | | | | | | |
| Monomer (b) | NPG | 1.0 | | | | | | 1.0 |
| | HD-N | | 1.0 | | | | | |
| | DOD-N | | | 1.0 | | | | |
| | 3G | | | | | | 5.0 | |
| | 9G | | | | 2.0 | | | |
| | 701 | | | | | | | |
| | 3PG | | | | | | | |
| | 9PG | | | | | | | |
| | DCP | | | | | | | |
| | BPE-100 | | | | | | | |
| | TMPT | | | | | 1.5 | | |
| Monomer (c) | TIPSA | | | | | | 10.0 | 15.0 |
| | TIPSMA | | | | | | | |
| Monomer (d) | HEMA | | | | | | | |
| | MEMA | | | | | | | |
| | MEA | | | | | | | |
| | M-40G | | | | | | | |
| | M-90G | | | | | | | |
| | M-230G | | | | | | | |
| | SA | | | | | | | |
| | CB-1 | | | | | | | 5.0 |

TABLE 1-continued

| Resin production example | | S1 | S2 | S3 | S4 | S5 | S6 | S7 |
|---|---|---|---|---|---|---|---|---|
| Monomer (f) | t-BMA | 15.0 | 20.0 | 16.0 | 25.0 | 20.0 | 20.0 | 20.0 |
| | n-BMA | 30.0 | 29.0 | 23.0 | | 8.5 | 5.0 | 8.0 |
| | EHMA | | | | 8.0 | | | |
| | n-BA | | | | 8.0 | | 10.0 | |
| | CHMA | | | | 6.0 | | | |
| | MMA | 14.0 | 25.0 | 6.0 | 6.0 | 20.0 | | 5.5 |
| | EA | | | 4.0 | | 5.0 | | 5.5 |
| | AA | | | | | | 5.0 | |
| Total | | 100.0 | 100.0 | 100.0 | 100.0 | 100.0 | 100.0 | 100.0 |
| Solid content concentration (mass %) | | 50.0 | 50.5 | 50.1 | 50.1 | 49.5 | 50.3 | 50.4 |
| Glass transition temperature (Tg: ° C.) | | 57 | 65 | 31 | 42 | 59 | 51 | 52 |
| Number average molecular weight (Mn) | | 18,300 | 17,000 | 17,900 | 22,100 | 20,900 | 36,000 | 18,500 |
| Content of (A) in silicon atom-containing resin (mass %) | | 40.0 | 25.0 | 50.0 | 45.0 | 45.0 | 45.0 | 40.0 |
| Content of (B) in silicon atom-containing resin (mass %) | | 1.0 | 1.0 | 1.0 | 2.0 | 1.5 | 5.0 | 1.0 |

TABLE 2

| Resin production example | | S8 | S9 | S10 | S11 | S12 | S13 |
|---|---|---|---|---|---|---|---|
| Monomer (a) | FM-0721 | | | | 30.0 | | |
| | FM-0725 | | | | | | |
| | KF-2012 | 35.0 | 15.0 | | | | |
| | X-22-2426 | | 15.0 | | | 5.0 | |
| | FM-7721 | | | 5.0 | | | |
| | FM-7725 | | | | | | |
| | X-22-164B | | | | 10.0 | | |
| | X-22-164E | | | | | 10.0 | |
| | FM-0711 | | | | | | 20.0 |
| | X-22-174ASX | | 15.0 | | | 25.0 | |
| | X22-174BX | | | 35.0 | | | 25.0 |
| Monomer (b) | NPG | 1.0 | 10.0 | | 2.0 | | |
| | HD-N | | | | | | |
| | DOD-N | | | | | | |
| | 3G | | | | | | |
| | 9G | | | | | | |
| | 701 | | 3.0 | | | 2.0 | |
| | 3PG | | | 1.0 | | | |
| | 9PG | | | | | | 1.0 |
| | DCP | | | | | | 1.0 |
| | BPE-100 | | | | | | 1.0 |
| | TMPT | | | | | | |
| Monomer (c) | TIPSA | 10.0 | | 20.0 | | | |
| | TIPSMA | | 10.0 | | 5.0 | | |
| Monomer (d) | HEMA | | | | | 3.0 | |
| | MEMA | 10.5 | | 5.0 | | | |
| | MEA | | | | 5.0 | 2.0 | |
| | M-40G | | | 1.0 | | | |
| | M-90G | | 2.0 | 1.0 | | | 1.0 |
| | M-230G | | | 1.0 | | | |
| | SA | | | | 2.5 | | 1.0 |
| | CB-1 | 5.0 | | | 2.5 | | |
| Monomer (f) | t-BMA | | 15.0 | 10.0 | 15.0 | 10.0 | 15.0 |
| | n-BMA | 28.0 | | | 8.0 | 3.0 | 5.0 |
| | EHMA | | | 6.0 | | | |
| | n-BA | | 10.0 | | | 5.0 | 10.0 |
| | CHMA | | | | | | 5.0 |
| | MMA | 10.5 | 5.0 | 15.0 | 15.0 | 25.0 | 15.0 |
| | EA | | | | 5.0 | 10.0 | |
| | AA | | | | | | |
| Total | | 100.0 | 100.0 | 100.0 | 100.0 | 100.0 | 100.0 |
| Solid content concentration (mass %) | | 50.6 | 50.3 | 49.9 | 50.1 | 49.8 | 50.2 |
| Glass transition temperature (Tg: ° C.) | | 32 | 58 | 38 | 55 | 46 | 46 |
| Number average molecular weight (Mn) | | 18,800 | 83,400 | 18,500 | 23,700 | 22,000 | 25,700 |

TABLE 2-continued

| Resin production example | S8 | S9 | S10 | S11 | S12 | S13 |
|---|---|---|---|---|---|---|
| Content of (A) in silicon atom-containing resin (mass %) | 35.0 | 45.0 | 40.0 | 40.0 | 40.0 | 45.0 |
| Content of (B) in silicon atom-containing resin (mass %) | 1.0 | 10.0 | 1.0 | 2.0 | 2.0 | 3.0 |

TABLE 3

| Resin production example | | T1 | T2 | T3 | T4 | T5 | T6 |
|---|---|---|---|---|---|---|---|
| Monomer (a) | FM-0721 | | | | | | |
| | FM-0725 | | | | | | |
| | KF-2012 | | | | | 45.0 | |
| | X-22-2426 | | | | | | |
| | FM-7721 | | | | | | |
| | FM-7725 | | | | | | 5.0 |
| | X-22-164B | | | | | | |
| | X-22-164E | | | | | | |
| | FM-0711 | | | | | | 35.0 |
| | X-22-174ASX | | | | | | |
| | X22-174BX | | | | | | 5.0 |
| Monomer (b) | NPG | 1.0 | | | | | |
| | HD-N | | | | | | |
| | DOD-N | | 5.0 | | | | |
| | 3G | | | 10.0 | | | |
| | 9G | | | | | | |
| | 701 | | | | | | |
| | 3PG | | | | | | |
| | 9PG | | | | | | |
| | DCP | | | | | | |
| | BPE-100 | | | | | | |
| | TMPT | | | | 3.0 | | |
| Monomer (c) | TIPSA | | 25.0 | 30.0 | | 15.0 | |
| | TIPSMA | | | | 35.0 | | 10.0 |
| Monomer (d) | HEMA | | | | | | |
| | MEMA | | | | | | 5.0 |
| | MEA | | | | | | |
| | M-40G | 1.0 | | | | | |
| | M-90G | 1.0 | | | | | |
| | M-230G | 1.0 | | | | | |
| | SA | | | | | | 5.0 |
| | CB-1 | | | | | 5.0 | |
| Monomer (f) | t-BMA | 20.0 | 20.0 | 15.0 | 20.0 | 27.0 | |
| | n-BMA | 26.0 | 10.0 | 8.0 | 10.0 | | 25.0 |
| | EHMA | | | | | | |
| | n-BA | 10.0 | 15.0 | 10.0 | 10.0 | | |
| | CHMA | | 5.0 | | | | |
| | MMA | 25.0 | 15.0 | 20.0 | 22.0 | 4.0 | 5.0 |
| | EA | 10.0 | 5.0 | 7.0 | | 4.0 | 5.0 |
| | AA | 5.0 | | | | | |
| Total | | 100.0 | 100.0 | 100.0 | 100.0 | 100.0 | 100.0 |
| Solid content concentration (mass %) | | 50.0 | 50.8 | 49.5 | 49.7 | 50.4 | 50.7 |
| Glass transition temperature (Tg: ° C.) | | 85 | 108 | 90 | 136 | 51 | 7 |
| Number average molecular weight (Mn) | | 18,000 | 35,000 | 56,700 | 27,400 | 11,000 | 12,500 |
| Content of (A) in silicon atom-containing resin (mass %) | | 0.0 | 0.0 | 0.0 | 0.0 | 45.0 | 45.0 |
| Content of (B) in silicon atom-containing resin (mass %) | | 1.0 | 5.0 | 10.0 | 3.0 | 0.0 | 0.0 |

TABLE 4

| Resin production example | | T7 | T8 | T9 | T10 | T11 | T12 |
|---|---|---|---|---|---|---|---|
| Monomer (a) | FM-0721 | | | 20.0 | | | |
| | FM-0725 | 25.0 | | | | | |
| | KF-2012 | | | | | | |
| | X-22-2426 | | | | 30.0 | | |
| | FM-7721 | | | 5.0 | | | |
| | FM-7725 | | | | | | |
| | X-22-164B | | | 10.0 | | | |

TABLE 4-continued

| Resin production example | | T7 | T8 | T9 | T10 | T11 | T12 |
|---|---|---|---|---|---|---|---|
| | X-22-164E | | | | 10.0 | | |
| | FM-0711 | | 30.0 | | | | |
| | X-22-174ASX | | | | | | |
| | X22-174BX | | | 5.0 | | | |
| Monomer (b) | NPG | | | | | | |
| | HD-N | | | | | | |
| | DOD-N | | | | | | |
| | 3G | | | | | | |
| | 9G | | | | | | |
| | 701 | | | | | | |
| | 3PG | | | | | | |
| | 9PG | | | | | | |
| | DCP | | | | | | |
| | BPE-100 | | | | | | |
| | TMPT | | | | | | |
| Monomer (c) | TIPSA | 30.0 | | | | 15.0 | |
| | TIPSMA | | 50.0 | | | | 20.0 |
| Monomer (d) | HEMA | | | 3.0 | | 7.0 | |
| | MEMA | | | | 10.0 | 5.0 | |
| | MEA | | | | 5.0 | | 5.0 |
| | M-40G | | | 2.0 | | | |
| | M-90G | | | | | | 3.0 |
| | M-230G | | | | | | |
| | SA | | | | | | 2.0 |
| | CB-1 | | | | | 5.0 | |
| Monomer (f) | t-BMA | 20.0 | | 15.0 | | 20.0 | 10.0 |
| | n-BMA | | | | 5.0 | 28.0 | 15.0 |
| | EHMA | | | 10.0 | | | 10.0 |
| | n-BA | | 5.0 | | 10.0 | 10.0 | 10.0 |
| | CHMA | | | | | | |
| | MMA | 20.0 | 10.0 | 15.0 | 20.0 | 1.0 | 15.0 |
| | EA | | 5.0 | 10.0 | 10.0 | 9.0 | 10.0 |
| | AA | 5.0 | | 5.0 | | | |
| Total | | 100.0 | 100.0 | 100.0 | 100.0 | 100.0 | 100.0 |
| Solid content concentration (mass %) | | 49.9 | 50.2 | 50.6 | 50.5 | 49.7 | 50.8 |
| Glass transition temperature (Tg: ° C.) | | 100 | 35 | 35 | −14 | 52 | 34 |
| Number average molecular weight (Mn) | | 9,500 | 11,900 | 10,900 | 11,300 | 9,100 | 10,100 |
| Content of (A) in silicon atom-containing resin (mass %) | | 25.0 | 30.0 | 40.0 | 40.0 | 0.0 | 0.0 |
| Content of (B) in silicon atom-containing resin (mass %) | | 0.0 | 0.0 | 0.0 | 0.0 | 0.0 | 0.0 |

Resin Production Example S14: Production of Silicon Atom-Containing Resin (S14)

To a four-necked flask equipped with a thermometer, a condenser, a stirrer, a dropping funnel, a nitrogen inlet tube, and a temperature controller, 55.0 parts by mass of xylene as a solvent was added and maintained at 100° C. A mixture liquid consisting of 40.0 parts by mass of KF-2012 and 8.0 parts by mass of FM-0711 as the monomer (a), 1.0 part by mass of NPG and 1.0 part by mass of 3G as the monomer (b), 1.0 part by mass of CB-1 as the monomer (d), 20.0 parts by mass of t-BMA, 20.0 parts by mass of n-BMA, 4.0 parts by mass of MMA, and 5.0 parts by mass of AA as the monomer (f), 20.0 parts by mass of xylene as a solvent, and 1.0 part by mass of tert-butylperoxy-2-ethylhexanoate as a radical polymerization initiator was added to the dropping funnel and added dropwise to the four-necked flask at a constant velocity over 3 hours, and after completion of the dropwise addition, incubated for 90 minutes. Then, a mixture liquid consisting of 25.0 parts by mass of xylene and 0.3 parts by mass of tert-butylperoxy-2-ethylhexanoate was added dropwise to the four-necked flask at a constant velocity over 30 minutes, and after completion of the dropwise addition, incubated for 1 hour, to obtain a resin composition (solution) (solid content concentration, 50 mass %) including a resin having a carboxyl group.

Subsequently, to a similar reaction vessel, 100 parts by mass of the resin composition, 6.5 parts by mass of copper (II) acetate, 12.5 parts by mass of a compound K1 [hydrogenated rosin (HYPALE CH, acid value 160 mgKOH/g, manufactured by Arakawa Chemical Industries, Ltd.)], and 60.0 parts by mass of xylene were added, and the temperature was raised to a reflux temperature, and reaction was continued for 18 hours while removing the mixture liquid of acetic acid, water, and a solvent in distillate and adding the same amount of xylene thereto. The end point of the reaction was determined by quantifying the amount of acetic acid in the distillate. After cooling the reaction liquid, n-butanol and xylene were added to obtain a resin composition (solution) (solid content concentration, 50 mass %) including a resin. The resin included in the resin composition is obtained by converting the carboxyl group of the resin having a carboxyl group into —$COO^{-}Cu^{2+}(^{-}OOC$—Y). Y is a structural moiety other than the carboxyl group of the compound K1.

Resin Production Example 515: Production of Silicon Atom-Containing Resin (S15)

A resin composition (solution) (solid content concentration, 50 mass %) including a resin having a carboxyl group was obtained in the same manner as in Production Example S14 except that the type and the amount of the monomer were changed as specified in Table 5.

Subsequently, to a similar reaction vessel, 100 parts by mass of the resin composition, 7.8 parts by mass of zinc(II) acetate, 12.1 parts by mass of a compound K2 [naphthenic acid (NA-200, acid value 200 mgKOH/g, manufactured by Yamato Yushi Kogyo K.K.)], and 60.0 parts by mass of xylene were added, and the temperature was raised to a reflux temperature, and reaction was continued for 18 hours while removing the mixture liquid of acetic acid, water, and the solvent in distillate and adding the same amount of xylene thereto. The end point of the reaction was determined by quantifying the amount of acetic acid in the distillate. After cooling the reaction liquid, n-butanol and xylene were added to obtain a resin composition (solution) (solid content concentration, 50 mass %) including a resin. The resin included in the resin composition is obtained by converting the carboxyl group of the resin having a carboxyl group into —COO—$Zn^{2+}$($^{-}$OOC—Y). Y is a structural moiety other than the carboxyl group of the compound K2.

Hereinafter, resins obtained in the resin production examples S14 and S15 are also respectively referred to as “resins S14, S15”, and resin compositions (solutions) obtained in the resin production examples S14 and S15 are also respectively referred to as “resin compositions S14, S15”.

Monomers used in the resin production examples S14 and S15 and use amounts (parts by mass) thereof are shown in Table 5. Table 5 shows the monomer used in production of the resin having a carboxyl group.

The glass transition temperature (Tg) and the number average molecular weight (Mn) of the obtained resins S14 and S15, and the solid content concentration of the obtained resin compositions S14 and S15 were measured according to the above measurement method. The results are also shown in Table 5. The number average molecular weight Mn was measured for the resin having a carboxyl group (resin before carrying out reaction for converting carboxyl group to —$COO^{-}Me^{2+}$($^{-}$OOC—Y)). Me is Cu or Zn.

TABLE 5

| Resin production example | | S14 | S15 |
|---|---|---|---|
| Monomer (a) | FM-0721 | | |
| | FM-0725 | | |
| | KF-2012 | 40.0 | |
| | X-22-2426 | | |
| | FM-7721 | | |
| | FM-7725 | | |
| | X-22-164B | | |
| | X-22-164E | | |
| | FM-0711 | 8.0 | 30.0 |
| | X-22-174ASX | | |
| | X22-174BX | | |
| Monomer (b) | NPG | 1.0 | |
| | HD-N | | |
| | DOD-N | | 1.0 |
| | 3G | 1.0 | |
| | 9G | | |
| | 701 | | |
| | 3PG | | |

TABLE 5-continued

| Resin production example | | S14 | S15 |
|---|---|---|---|
| | 9PG | | |
| | DCP | | |
| | BPE-100 | | |
| | TMPT | | |
| Monomer (c) | TIPSA | | 25.0 |
| | TIPSMA | | |
| Monomer (d) | HEMA | | |
| | MEMA | | |
| | MEA | | |
| | M-40G | | |
| | M-90G | | |
| | M-230G | | |
| | SA | | |
| | CB-1 | 1.0 | |
| Monomer (f) | t-BMA | 20.0 | 20.0 |
| | n-BMA | 20.0 | 5.0 |
| | EHMA | | |
| | n-BA | | 4.0 |
| | CHMA | | |
| | MMA | 4.0 | 10.0 |
| | EA | | |
| | AA | 5.0 | 5.0 |
| Total | | 100.0 | 100.0 |
| Solid content concentration (mass %) | | 50.6 | 50.7 |
| Glass transition temperature (Tg: ° C.) | | 55 | 61 |
| Number average molecular weight (Mn) | | 22,500 | 19,000 |
| Content of (A) in silicon atom-containing resin (mass %) | | 48.0 | 30.0 |
| Content of (B) in silicon atom-containing resin (mass %) | | 2.0 | 1.0 |

The details of various monomer abbreviations shown in Table 1 to Table 5 are as follows.

[Monomer (a)]

FM-0721: manufactured by JNC Corporation, one-terminal methacryloyloxyalkyl-modified organopolysiloxane, monomer in which, in the formula (I'), m=0, b=3, and n=65 are set, $R^1$ to $R^4$ and $R^{31}$ are methyl groups, and $R^5$ is an n-butyl group, molecular weight: 5,000

FM-0725: manufactured by INC Corporation, one-terminal methacryloyloxyalkyl-modified organopolysiloxane, monomer in which, in the formula (I'), m=0, b=3, and n=132 are set, $R^1$ to $R^4$ and $R^{31}$ are methyl groups, and $R^5$ is an n-butyl group, molecular weight: 10,000

KF-2012: manufactured by Shin-Etsu Chemical, one-terminal methacryloyloxyalkyl-modified organopolysiloxane, monomer in which, in the formula (I'), m=0 is set, and $R^1$ to $R^5$ and $R^{31}$ are methyl groups, molecular weight: 4,600

X-22-2426: manufactured by Shin-Etsu Chemical, one-terminal methacryloyloxyalkyl-modified organopolysiloxane, monomer in which, in the formula (I'), m=0 is set, and $R^1$ to $R^5$ and $R^{31}$ are methyl groups, molecular weight: 12,000

FM-7721: manufactured by INC Corporation, both-terminal methacryloyloxyalkyl-modified organopolysiloxane, monomer in which, in the formula (III'), q and s=0, f and g=3, and r=64 are set, and $R^9$ to $R^{12}$, and $R^{33}$ and $R^{34}$ are methyl groups, molecular weight: 5,000

FM-7725: manufactured by INC Corporation, both-terminal methacryloyloxyalkyl-modified organopolysiloxane, monomer in which, in the formula (III'), q and s=0, f and g=3, and r=131 are set, and $R^9$ to $R^{12}$, $R^{33}$ and $R^{34}$ are methyl groups, molecular weight: 10,000

X-22-164B: manufactured by Shin-Etsu Chemical, both-terminal methacryloyloxyalkyl-modified organopolysiloxane, monomer in which, in the formula (III'), q and s=0 is set, and $R^9$ to $R^{12}$, $R^{33}$ and $R^{34}$ are methyl groups, molecular weight: 3,200

X-22-164E: manufactured by Shin-Etsu Chemical, both-terminal methacryloyloxyalkyl-modified organopolysiloxane, monomer in which, in the formula (III'), q and s=0 is set, and $R^9$ to $R^{12}$, $R^{33}$ and $R^{34}$ are methyl groups, molecular weight: 7,800

FM-0711: manufactured by INC Corporation, one-terminal methacryloyloxyalkyl-modified organopolysiloxane, monomer in which, in the formula (I'), m=0, b=3, and n=10 are set, $R^1$ to $R^4$ and $R^{31}$ are methyl groups, and $R^5$ is a n-butyl group, molecular weight: 1,000

X-22-174ASX: manufactured by Shin-Etsu Chemical, one-terminal methacryloyloxyalkyl-modified organopolysiloxane, monomer in which, in the formula (I'), m=0 is set, and $R^1$ to $R^5$ and $R^{31}$ are methyl groups, molecular weight: 900

X-22-174BX: manufactured by Shin-Etsu Chemical, one-terminal methacryloyloxyalkyl-modified organopolysiloxane, monomer in which, in the formula (I'), m=0 is set, and $R^1$ to $R^5$ and $R^{31}$ are methyl groups, molecular weight: 2,300

[Monomer (b)]

NPG: manufactured by Shin Nakamura Chemical, neopentyl glycol dimethacrylate

HD-N: manufactured by Shin Nakamura Chemical, 1,6-hexanediol dimethacrylate

DOD-N: manufactured by Shin Nakamura Chemical, 1,10-decanediol dimethacrylate

3G: manufactured by Shin Nakamura Chemical, triethylene glycol dimethacrylate

9G: manufactured by Shin Nakamura Chemical, polyethylene glycol #400 dimethacrylate 701: manufactured by Shin Nakamura Chemical, 2-hydroxy-1,3-dimethacryloxy propane 3PG: manufactured by Shin Nakamura Chemical, tripropylene glycol dimethacrylate 9PG: manufactured by Shin Nakamura Chemical, polypropylene glycol dimethacrylate DCP: manufactured by Shin Nakamura Chemical, tricyclodecane dimethanol dimethacrylate BPE-100: manufactured by Shin Nakamura Chemical, ethoxylated bisphenol A dimethacrylate TMPT: manufactured by Shin Nakamura Chemical, trimethylolpropane trimethacrylate

[Monomer (c)]

TIPSA: triisopropylsilyl acrylate, manufactured by Shin-Etsu Chemical

TIPSMA: triisopropylsilyl methacrylate, manufactured by Shin-Etsu Chemical

[Monomer (d)]

HEMA: 2-hydroxyethyl methacrylate, manufactured by Mitsubishi Chemical

MEMA: 2-methoxyethyl methacrylate, manufactured by Mitsubishi Chemical

MEA: 2-methoxyethyl acrylate, manufactured by Nippon Shokubai

M-40G: methoxy polyethylene glycol methacrylate (the number of repetitions of oxyethylene chain=4), manufactured by Shin Nakamura Chemical M-90G: methoxy polyethylene glycol methacrylate (the number of repetitions of oxyethylene chain=9), manufactured by Shin Nakamura Chemical M-230G: methoxy polyethylene glycol methacrylate (the number of repetitions of oxyethylene chain=23), manufactured by Shin Nakamura Chemical SA: methacryloyloxyethyl succinic acid, manufactured by Shin Nakamura Chemical CB-1: methacryloyloxyethyl phthalic acid, manufactured by Shin Nakamura Chemical

[Monomer (f)]

t-BMA: t-butyl methacrylate, manufactured by Mitsubishi Chemical n-BMA: n-butyl methacrylate, manufactured by Mitsubishi Gas Chemical EHMA: 2-ethylhexyl methacrylate, manufactured by Mitsubishi Chemical n-BA: n-butyl acrylate, manufactured by Toagosei CHMA: cyclohexyl methacrylate, manufactured by Mitsubishi Gas Chemical MMA: methyl methacrylate, manufactured by Mitsubishi Gas Chemical EA: ethyl acrylate, manufactured by Toagosei AA: acrylic acid, manufactured by Osaka Organic Chemical Industry

Example 1

(1) Preparation of Antifouling Coating Composition 1

88.72 parts by mass of the silicon atom-containing resin (S1) obtained in the above-mentioned manner, 2.00 parts by mass of BYK-066N as a defoaming agent, 0.28 parts by mass of TI-PURE R-900 as a pigment 1, 3.00 parts by mass of Bayferox 130 as a pigment 2, and 6.00 parts by mass of MONORAL3300 as an anti-sagging agent were mixed and dispersed with the use of a disperser (2,000 rpm) to prepare an antifouling coating composition 1. The formulation of the antifouling coating composition 1 is shown in Table 6. The amounts in the formulation mean the actual amounts (parts by mass) including the volatile matter such as solvent.

(2) Formation of Coating Film

The antifouling coating composition 1 was sprayed to an SPCC steel plate previously coated with an antirust coating composition so as to achieve a dry coating thickness of 300 μm, and the resultant was left to stand in a room for two days and two nights for drying to obtain a test plate including an antifouling coating film.

Examples 2 to 21, Comparative Examples 1 to 12

Antifouling coating compositions 2 to 21 and comparative antifouling coating compositions 1 to 12 were prepared in the same manner as in the preparation method for the antifouling coating composition 1 in Example 1 except that the type and the amount of the components were changed as specified in Table 6 to Table 10. Moreover, test plates including an antifouling coating film were obtained in the same manner as in Example 1 except that the antifouling coating compositions 2 to 21 and the comparative antifouling coating compositions 1 to 12 were used.

The details of the components shown in Table 6 to Table 10 are as described below.

Defoaming agent: silicone-based antifoaming agent, "BYK-066N" manufactured by BYK, nonvolatile content: 0.7 mass %

Pigment 1: titanium oxide, "TI-PURE R-900" manufactured by DuPont

Pigment 2: iron oxide, "Bayferox 130" manufactured by LANXESS

Anti-sagging agent: polyamide-type viscosity modifier, “MONORAL3300” manufactured by HS CHEM, nonvolatile content: 20 mass %

Plasticizer: polyvinyl ethyl ether, “Lutonal A25” manufactured by BASF, nonvolatile content: 95 mass %

Antifouling agent 1: cuprous oxide, manufactured by Furukawa Chemicals

Antifouling agent 2: copper pyrithione, “Copper Omadine” manufactured by Arch Chemicals Antifouling agent 3: zinc pyrithione, “Zinc Omadine” manufactured by Arch Chemicals Antifouling agent 4: medetomidine, “Selektope” manufactured by I-TECH AB Antifouling agent 5: Sea-Nine 211, 4,5-dichloro-2-n-octyl-4-isothiazolin-3-one (4,5-dichloro-2-n-octyl-3(2H) isothiazolone), “Sea-Nine 211” manufactured by Rohm and Haas Antifouling agent 6: Irgarol, N'-tert-butyl-N-cyclopropyl-6-(methylthio)-1,3,5-triazine-2,4-diamine, “Irgarol 1051” manufactured by Ciba Specialty Chemicals Antifouling agent 7: ECONEA, 4-bromo-2-(4-chlorophenyl)-5-(trifluoromethyl)-1H-pyrrole-3-carbonitrile, “ECONEA” manufactured by Janssen PMP (Evaluation of Antifouling Coating Composition)

[a] State of Coating Film

Each of the antifouling coating compositions obtained in Examples and Comparative Examples was applied to a glass plate (manufactured by TP Giken) with the use of a doctor blade so as to achieve a dry coating thickness of 100 μm, and the resultant was left to stand in a room for two days and two nights for drying. The state of coating film was evaluated with a touch of a finger. The evaluation criteria are as follows. Three points or higher are considered as qualified.

3: Coating film had no tack or crack.

2: Coating film had a crack.

1: Coating film had a tack.

[b] Impact Resistance of Coating Film

The test plates obtained in Examples and Comparative Examples were evaluated in terms of the impact resistance of the coating film in accordance with JIS K 5600-5-3 (Falling-weight test).

To be more specific, a DuPont-type impact tester (the hammer had a radius of 6.35 mm, manufactured by COTEC) was used, and the test plate with the coating film side facing upward was sandwiched between the hammer and the receiver, to which a 1-kg weight was dropped from a certain height, followed by visual examination to measure the height (cm) at which a break and/or peeling (damage) occurred in the coating film side. Those that were not damaged in the coating film side from a height of 30 cm were considered as qualified.

The test was performed at a temperature of 23±2° C. and a relative humidity of 50±5%.

[c] Antifouling Property of Coating Film (Stational Raft Antifouling Property Test)

The test plates obtained in Examples and Comparative Examples were immersed in a raft installed in Aioi Bay, Ako City, Hyogo Prefecture, to perform an organism adhesion test for 48 months. After a lapse of 6 months, 12 months, 18 months, 24 months, and 48 months from the start of the test, the adhesion area of marine organisms was evaluated by visual examination. The evaluation criteria are as follows. Three points or higher are considered as qualified.

5: The attachment area of marine organisms is greater than or equal to 0% and less than 5%.

4: The attachment area of marine organisms is greater than or equal to 5% and less than 10%.

3: The attachment area of marine organisms is greater than or equal to 10% and less than 15%.

2: The attachment area of marine organisms is greater than or equal to 15% and less than 30%.

1: The attachment area of marine organisms is greater than or equal to 30%.

Examples 1 to 21 were examples of the present invention, and the coating films thus obtained were good in terms of the state of coating film and also good in impact resistance and antifouling property.

In Comparative Examples 1 to 4, the resins did not include the constituent unit (A), and none of the coating films satisfied all of the state of coating film, the impact resistance, and the antifouling property.

In Comparative Examples 5 to 10, the resins did not include the constituent unit (B), and none of the coating films satisfied all of the state of coating film, the impact resistance, and the antifouling property.

In Comparative Examples 11 and 12, the resins included neither the constituent unit (A) nor (B), and the coating films were poor in the state of coating film and did not exhibit sufficiently satisfactory impact resistance or antifouling property.

TABLE 6

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Antifouling coating composition No. | 1 | 2 | 3 | 4 | 5 | 6 | 7 | 8 |
| | S1 | S2 | S3 | S4 | S5 | S6 | S7 | S8 |
| Resin | 88.72 | 88.72 | 88.72 | 88.72 | 88.72 | 88.72 | 88.72 | 88.72 |
| Defoaming agent | 2.00 | 2.00 | 2.00 | 2.00 | 2.00 | 2.00 | 2.00 | 2.00 |
| Plasticizer | | | | | | | | |
| Pigment 1 | 0.28 | 0.28 | 0.28 | 0.28 | 0.28 | 0.28 | 0.28 | 0.28 |
| Pigment 2 | 3.00 | 3.00 | 3.00 | 3.00 | 3.00 | 3.00 | 3.00 | 3.00 |
| Anti-sagging agent | 6.00 | 6.00 | 6.00 | 6.00 | 6.00 | 6.00 | 6.00 | 6.00 |
| Antifouling agent 1 | | | | | | | | |
| Antifouling agent 2 | | | | | | | | |
| Antifouling agent 3 | | | | | | | | |
| Antifouling agent 4 | | | | | | | | |

TABLE 6-continued

| | | | | | | | | |
|---|---|---|---|---|---|---|---|---|
| Antifouling agent 5 | | | | | | | | |
| Antifouling agent 6 | | | | | | | | |
| Antifouling agent 7 | | | | | | | | |
| Total | 100.00 | 100.00 | 100.00 | 100.00 | 100.00 | 100.00 | 100.00 | 100.00 |
| State of coating film | 3 | 3 | 3 | 3 | 3 | 3 | 3 | 3 |
| Impact resistance (cm) | 30 | 30 | 40 | 30 | 30 | 40 | 30 | 30 |
| Antifouling property 6 months | 5 | 5 | 5 | 5 | 5 | 5 | 5 | 5 |
| 12 months | 5 | 5 | 4 | 5 | 5 | 5 | 5 | 5 |
| 18 months | 3 | 3 | 3 | 3 | 3 | 4 | 5 | 5 |
| 24 months | 3 | 3 | 3 | 3 | 3 | 3 | 4 | 4 |
| 48 months | 2 | 2 | 2 | 2 | 2 | 2 | 3 | 3 |

TABLE 7

| | Ex. 9 | Ex. 10 | Ex. 11 | Ex. 12 | Ex. 13 | Ex. 14 | Ex. 15 |
|---|---|---|---|---|---|---|---|
| Antifouling coating composition No. | 9 | 10 | 11 | 12 | 13 | 14 | 15 |
| | S9 | S10 | S11 | S12 | S13 | S14 | S15 |
| Resin | 78.72 | 88.72 | 88.72 | 88.72 | 88.72 | 88.72 | 88.72 |
| Defoaming agent | 2.00 | 2.00 | 2.00 | 2.00 | 2.00 | 2.00 | 2.00 |
| Plasticizer | 10.00 | | | | | | |
| Pigment 1 | 0.28 | 0.28 | 0.28 | 0.28 | 0.28 | 0.28 | 0.28 |
| Pigment 2 | 3.00 | 3.00 | 3.00 | 3.00 | 3.00 | 3.00 | 3.00 |
| Anti-sagging agent | 6.00 | 6.00 | 6.00 | 6.00 | 6.00 | 6.00 | 6.00 |
| Antifouling agent 1 | | | | | | | |
| Antifouling agent 2 | | | | | | | |
| Antifouling agent 3 | | | | | | | |
| Antifouling agent 4 | | | | | | | |
| Antifouling agent 5 | | | | | | | |
| Antifouling agent 6 | | | | | | | |
| Antifouling agent 7 | | | | | | | |
| Total | 100.00 | 100.00 | 100.00 | 100.00 | 100.00 | 100.00 | 100.00 |
| State of coating film | 3 | 3 | 3 | 3 | 3 | 3 | 3 |
| Impact resistance (cm) | 80 | 30 | 50 | 30 | 30 | 40 | 30 |
| Antifouling property 6 months | 5 | 5 | 5 | 5 | 5 | 5 | 5 |
| 12 months | 4 | 5 | 5 | 5 | 5 | 5 | 5 |
| 18 months | 4 | 5 | 5 | 5 | 4 | 4 | 5 |
| 24 months | 3 | 4 | 4 | 4 | 3 | 3 | 4 |
| 48 months | 2 | 3 | 3 | 3 | 2 | 2 | 3 |

TABLE 8

| | Ex. 16 | Ex. 17 | Ex. 18 | Ex. 19 | Ex. 20 | Ex. 21 |
|---|---|---|---|---|---|---|
| Antifouling coating composition No. | 16 | 17 | 18 | 19 | 20 | 21 |
| | S7 | S7 | S2 | S12 | S8 | S8 |
| Resin | 88.62 | 45.22 | 80.72 | 81.72 | 73.72 | 89.22 |
| Defoaming agent | 2.00 | 1.00 | 1.00 | 1.00 | 1.00 | 1.00 |
| Plasticizer | | | | | 5.00 | |
| Pigment 1 | 0.28 | 0.28 | 0.28 | 0.28 | 0.28 | 0.28 |
| Pigment 2 | 3.00 | 3.00 | 3.00 | 3.00 | 3.00 | 3.00 |
| Anti-sagging agent | 6.00 | 3.00 | 5.00 | 6.00 | 5.00 | 6.00 |
| Antifouling agent 1 | | 40.00 | | | | |
| Antifouling agent 2 | | 7.50 | | | | |
| Antifouling agent 3 | | | 10.00 | | 8.00 | |
| Antifouling agent 4 | 0.10 | | | | | 0.50 |

TABLE 8-continued

| | | | | | | | |
|---|---|---|---|---|---|---|---|
| Antifouling agent 5 | | | | | 5.00 | | |
| Antifouling agent 6 | | | | | | 4.00 | |
| Antifouling agent 7 | | | | | 3.00 | | |
| Total | | 100.00 | 100.00 | 100.00 | 100.00 | 100.00 | 100.00 |
| State of coating film | | 3 | 3 | 3 | 3 | 3 | 3 |
| Impact resistance | (cm) | 50 | 50 | 40 | 50 | 70 | 30 |
| Antifouling | 6 months | 5 | 5 | 5 | 5 | 5 | 5 |
| property | 12 months | 5 | 5 | 5 | 5 | 5 | 5 |
| | 18 months | 5 | 5 | 5 | 5 | 5 | 5 |
| | 24 months | 5 | 5 | 5 | 5 | 5 | 5 |
| | 48 months | 5 | 4 | 4 | 4 | 4 | 5 |

TABLE 9

| | | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Comparative antifouling coating composition No. | | 1 | 2 | 3 | 4 | 5 | 6 |
| | | T1 | T2 | T3 | T4 | T5 | T6 |
| Resin | | 88.72 | 88.72 | 88.72 | 88.72 | 88.72 | 88.72 |
| Defoaming agent | | 2.00 | 2.00 | 2.00 | 2.00 | 2.00 | 2.00 |
| Plasticizer | | | | | | | |
| Pigment 1 | | 0.28 | 0.28 | 0.28 | 0.28 | 0.28 | 0.28 |
| Pigment 2 | | 3.00 | 3.00 | 3.00 | 3.00 | 3.00 | 3.00 |
| Anti-sagging agent | | 6.00 | 6.00 | 6.00 | 6.00 | 6.00 | 6.00 |
| Total | | 100.00 | 100.00 | 100.00 | 100.00 | 100.00 | 100.00 |
| State of coating film | | 3 | 2 | 3 | 2 | 3 | 1 |
| Impact resistance | (cm) | 15 | 10 | 30 | 10 | 10 | 10 |
| Antifouling | 6 months | 1 | 1 | 1 | 1 | 4 | 2 |
| property | 12 months | 0 | 0 | 0 | 0 | 4 | 0 |
| | 18 months | 0 | 0 | 0 | 0 | 3 | 0 |
| | 24 months | 0 | 0 | 0 | 0 | 3 | 0 |

TABLE 10

| | | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| Comparative antifouling coating composition No. | | 7 | 8 | 9 | 10 | 11 | 12 |
| | | T7 | T8 | T9 | T10 | T11 | T12 |
| Resin | | 88.72 | 88.72 | 88.72 | 88.72 | 83.72 | 88.72 |
| Defoaming agent | | 2.00 | 2.00 | 2.00 | 2.00 | 2.00 | 2.00 |
| Plasticizer | | | | | | 5.00 | |
| Pigment 1 | | 0.28 | 0.28 | 0.28 | 0.28 | 0.28 | 0.28 |
| Pigment 2 | | 3.00 | 3.00 | 3.00 | 3.00 | 3.00 | 3.00 |
| Anti-sagging agent | | 6.00 | 6.00 | 6.00 | 6.00 | 6.00 | 6.00 |
| Total | | 100.00 | 100.00 | 100.00 | 100.00 | 100.00 | 100.00 |
| State of coating film | | 2 | 3 | 3 | 1 | 3 | 3 |
| Impact resistance | (cm) | 5 | 10 | 10 | 10 | 15 | 10 |
| Antifouling | 6 months | 2 | 3 | 3 | 2 | 0 | 0 |
| property | 12 months | 1 | 2 | 1 | 0 | 0 | 0 |
| | 18 months | 0 | 1 | 1 | 0 | 0 | 0 |
| | 24 months | 0 | 0 | 0 | 0 | 0 | 0 |

INDUSTRIAL APPLICABILITY

The antifouling coating composition according to the present invention makes it possible to form a coating film that is capable of exhibiting good antifouling performance for a long period of time while immersed in water (sea water), that has good impact resistance, and that is not easily degraded. The antifouling coating composition according to the present invention can be suitably used as an antifouling coating composition to be applied to an underwater moving body such as a ship or to an in-water structure.

The invention claimed is:

1. An antifouling coating composition comprising a silicon atom-containing resin, wherein the silicon atom-containing resin includes:

a constituent unit (A) derived from a monomer (a) having at least one kind of silicon atom-containing group selected from the group consisting of a group represented by a formula (I) below, a group represented by a formula (II) below, a group represented by a formula (III) below, and a group represented by a formula (IV) below; and a constituent unit (B) derived from a monomer (b) which is a polyfunctional (meth)acrylic acid ester having two or more (meth)acryloyloxy groups:

[Chemical formula 1]

(I')

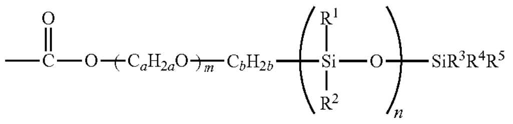

in the formula (I), a and b each independently represent an integer of 2 to 5, m represents an integer of 0 to 50, and n represents an integer of 3 to 270; and $R^1$ to $R^5$ each independently represent an alkyl group, an alkoxy group, a phenyl group, a substituted phenyl group, a phenoxy group, or a substituted phenoxy group;

[Chemical formula 2]

(II)

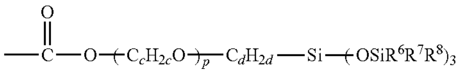

in the formula (II), c and d each independently represent an integer of 2 to 5, and p represents an integer of 0 to 50; $R^6$, $R^7$ and $R^8$ each independently represent an alkyl group, $R^a$, or $R^b$;

$R^a$ is

[Chemical formula 3]

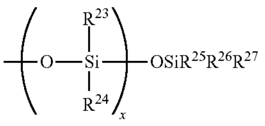

in the formula, x represents an integer of 0 to 200, and $R^{23}$ to $R^{27}$ are the same or different and each represent an alkyl group; and $R^b$ is

[Chemical formula 4]

$$-R^{28}-(OC_2H_4)_y-OR^{29}$$

in the formula, y represents an integer of 1 to 200, and $R^{28}$ and $R^{29}$ are the same or different and each represent an alkyl group;

[Chemical formula 5]

(III)

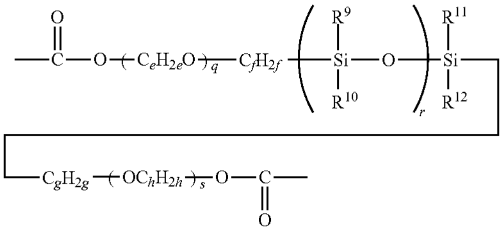

in the formula (III), e, f, g, and h each independently represent an integer of 2 to 5, q and s each independently represent an integer of 0 to 50, and r represents an integer of 3 to 270; and $R^9$ to $R^{12}$ each independently represent an alkyl group, an alkoxy group, a phenyl group, a substituted phenyl group, a phenoxy group, or a substituted phenoxy group;

[Chemical formula 6]

(IV)

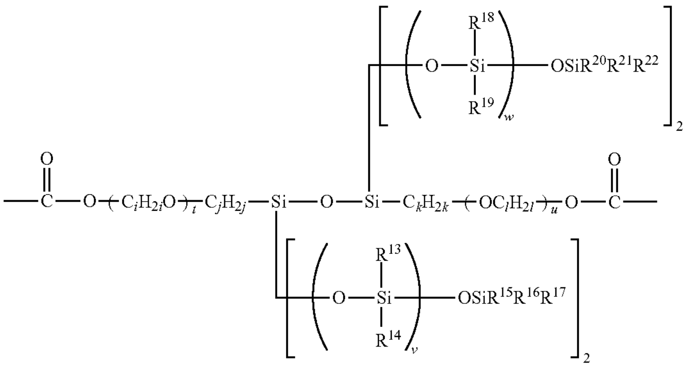

in the formula (IV), i, j, k, and 1 each independently represent an integer of 2 to 5, t and u each independently represent an integer of 0 to 50, and v and w each independently represent an integer of 0 to 70; and $R^{13}$ to $R^{22}$ are the same or different and each represent an alkyl group, and wherein a content of the constituent unit (B) is less than or equal to 30 mass % in all constituent units contained in the silicon atom-containing resin, and the monomer (b) is a compound (b-1) represented by a formula (b-1) below (b-1)

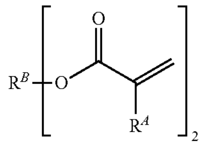

in the formula (b-1), RA each independently represents a hydrogen atom or a methyl group, $R^B$ represents a divalent hydrocarbon group that may have a substituent, and at least one-$CH_2$-of the hydrocarbon group may be replaced by—O—or —C (═0)—1.

2. The antifouling coating composition according to claim 1, wherein the silicon atom-containing resin further includes a constituent unit (C) derived from a monomer (c) having a triorganosilyloxycarbonyl group.

3. The antifouling coating composition according to claim 1, wherein the silicon atom-containing resin further includes a constituent unit (D) derived from a monomer (d) which is a monofunctional (meth)acrylic acid ester represented by a formula (d) below:

$$CH_2=C(R^C)(COOR^D) \quad (d)$$

in the formula (d), $R^C$ represents a hydrogen atom or a methyl group; and $R^D$ represents a monovalent group including one or more kinds selected from the group consisting of a hydroxyl group, a carboxy group, and an oxyalkylene chain.

4. The antifouling coating composition according to claim 3, wherein $R^D$ in the formula (d) represents a monovalent group containing an oxyalkylene chain.

5. The antifouling coating composition according to claim 1, wherein a content of the constituent unit (A) is greater than or equal to 20 mass % in all constituent units contained in the silicon atom-containing resin.

6. The antifouling coating composition according to claim 1, wherein a content of the constituent unit (B) is less than or equal to 15 mass % in all constituent units contained in the silicon atom-containing resin.

7. The antifouling coating composition according to claim 1, wherein the silicon atom-containing resin further includes a constituent unit (E) derived from a monomer (e) having at least one kind of metal atom-containing group selected from the group consisting of a group represented by a formula (V) below and a group represented by a formula (VI) below:

[Chemical formula 7]

(V)

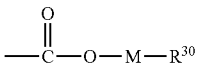

in the formula (V), M represents a divalent metal atom, and $R^{30}$ represents an organic acid residue or an alcohol residue; and

[Chemical formula 8]

(VI)

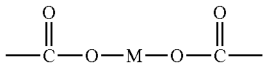

in the formula (VI), M represents a divalent metal atom.

8. The antifouling coating composition according to claim 1, not comprising an antifouling agent.

9. The antifouling coating composition according to claim 1, further comprising an antifouling agent.

10. The antifouling coating composition according to claim 9, wherein the antifouling agent is at least one kind selected from the group consisting of cuprous oxide, pyrithione metal salt, 4,5-dichloro-2-n-octyl-4-isothiazolin-3-one, 2-methylthio-4-t-butylamino-6-cyclopropylamino-s-triazine, 4-bromo-2-(4-chlorophenyl)-5-(trifluoromethyl)-1H-pyrrole-3-carbonitrile, and medetomidine.

11. An antifouling coating film formed from the antifouling coating composition according to claim 1.

12. A composite coating film comprising a primer coating film formed from an antirust coating composition, and an antifouling coating film formed from the antifouling coating composition according to claim 1 and overlaid on the primer coating film.

13. A ship comprising the antifouling coating film according to claim 11.

14. An in-water structure comprising the antifouling coating film according to claim 11.

15. A ship comprising the composite coating film according to claim 12.

16. An in-water structure comprising the composite coating film according to claim 12.

* * * * *